(12) United States Patent
Gurelli et al.

(10) Patent No.: US 11,901,972 B2
(45) Date of Patent: Feb. 13, 2024

(54) ANGULAR RELATIONSHIP DETERMINATION USING FOCAL POINT PERTURBATION

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Navid Abedini, Basking Ridge, NJ (US); Tao Luo, San Diego, CA (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/480,598

(22) Filed: Sep. 21, 2021

(65) Prior Publication Data

US 2023/0089054 A1    Mar. 23, 2023

(51) Int. Cl.
*H04B 7/04* (2017.01)
*G01S 3/46* (2006.01)
*G01S 5/02* (2010.01)

(52) U.S. Cl.
CPC ............ *H04B 7/04013* (2023.05); *G01S 3/46* (2013.01); *G01S 5/0273* (2013.01)

(58) Field of Classification Search
CPC . G01S 3/46; G01S 3/14; G01S 5/0273; H04B 7/04013
See application file for complete search history.

(56) References Cited

FOREIGN PATENT DOCUMENTS

CN    111245494 A    6/2020

OTHER PUBLICATIONS

International Search Report and Written Opinion—PCT/US2022/041169—ISA/EPO—dated Jan. 2, 2023.
Rajatheva N., et al., "Scoring the Terabit/s Goal: Broadband Connectivity in 6G", Arxiv.org, 201 Olin Library Cornell University, Ithaca, NY, 14853, Aug. 17, 2020, XP081742728, abstract, pp. 1-45.
Wymeersch H., et al., "Radio Localization and Mapping with Reconfigurable Intelligent Surfaces", Arxiv.org, 201 Olin Library Cornell University, Ithaca, NY, 14853, Dec. 19, 2019, XP081569725, pp. 1-7, Figure 1, Abstract, Right-Hand Column, Lines 29-31, Figure 3, pp. 5,6, p. 2, left-hand column, line 2-8 p. 3, left-hand column, line 2-4 p. 4, right-hand column, lines 6, 7, 11, 12, 36, 37 p. 5, left-hand column, line 15-17, pp. 5,6.

*Primary Examiner* — Gregory C. Issing
(74) *Attorney, Agent, or Firm* — Sunstein LLP

(57) ABSTRACT

An angular relationship determination method includes: obtaining, at an apparatus, a first phase difference indication corresponding to a first difference in phase between a first signal wirelessly received by a wireless signaling device from a transmitter and a second signal wirelessly received by the wireless signaling device from the transmitter; and determining, at the apparatus, a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

30 Claims, 15 Drawing Sheets

US 11,901,972 B2

ANGULAR RELATIONSHIP DETERMINATION USING FOCAL POINT PERTURBATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example apparatus includes: a communication interface; a memory; and a processor communicatively coupled to the communication interface and the memory and configured to: obtain a first phase difference indication corresponding to a first difference in phase between a first signal wirelessly received by a wireless signaling device from a transmitter and a second signal wirelessly received by the wireless signaling device from the transmitter; and determine a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

An example angular relationship determination method includes: obtaining, at an apparatus, a first phase difference indication corresponding to a first difference in phase between a first signal wirelessly received by a wireless signaling device from a transmitter and a second signal wirelessly received by the wireless signaling device from the transmitter; and determining, at the apparatus, a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

Another example apparatus includes: means for obtaining a first phase difference indication corresponding to a first difference in phase between a first signal wirelessly received by a wireless signaling device from a transmitter and a second signal wirelessly received by the wireless signaling device from the transmitter; and means for determining a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

An example non-transitory, processor-readable storage medium includes processor-readable instructions to cause a processor, of an apparatus, to: obtain a first phase difference indication corresponding to a first difference in phase between a first signal wirelessly received by a wireless signaling device from a transmitter and a second signal wirelessly received by the wireless signaling device from the transmitter; and determine a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

DETAILED DESCRIPTION

Figure 1:
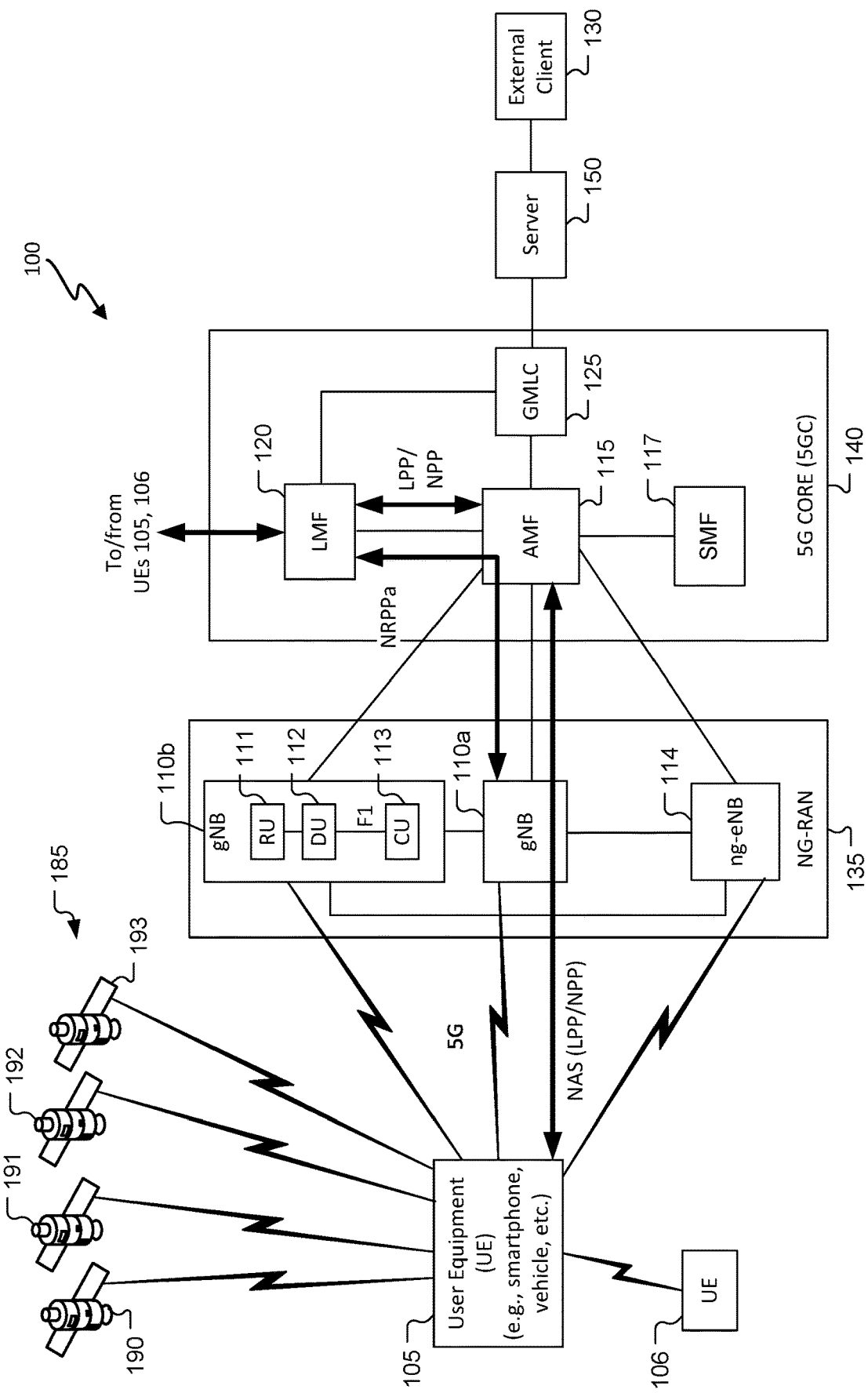
FIG. 1 is a simplified diagram of an example wireless communications system.

Techniques are discussed herein for determining angular relationships between transmitters and receivers of wireless signals. For example, a transmitter may transmit reference signals with defocused beams with different respective virtual focal points (different effective origination points) and phases of the reference signals may be measured by a receiver. The transmitter may, for example, be an intelligent reflecting surface and the receiver may be a user equipment. Phase difference based on the measured phases is used to determine an angular relationship of the transmitter and receiver (e.g., an angle from the transmitter to the receiver), e.g., based on the phase difference between reference signal measurements and the virtual focal points of the reference signals. Multiple angles from multiple transmitters to the receiver may be used to determine a position estimate for the receiver. Also or alternatively, a distance from the transmitter to the receiver may be determined and used in combination with the angle from the transmitter to the receiver to determine a position estimate for the receiver. These are examples, and other examples may be implemented.

Items and/or techniques described herein may provide one or more of the following capabilities, as well as other capabilities not mentioned. A focusing process, e.g., an initial focusing process, for focusing a beam at a target device may be expedited. A position of a target device may be determined, possibly more quickly than with prior techniques. Techniques for determining angular relationships between entities may also provide watermarking functionality to help distinguish between desired signals and undesired, e.g., multipath, signals. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*a* includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*a*. The DU 112 hosts the Radio Link Control (RLC), Medium Access Control (MAC), and physical layers of the gNB 110*a*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*a*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
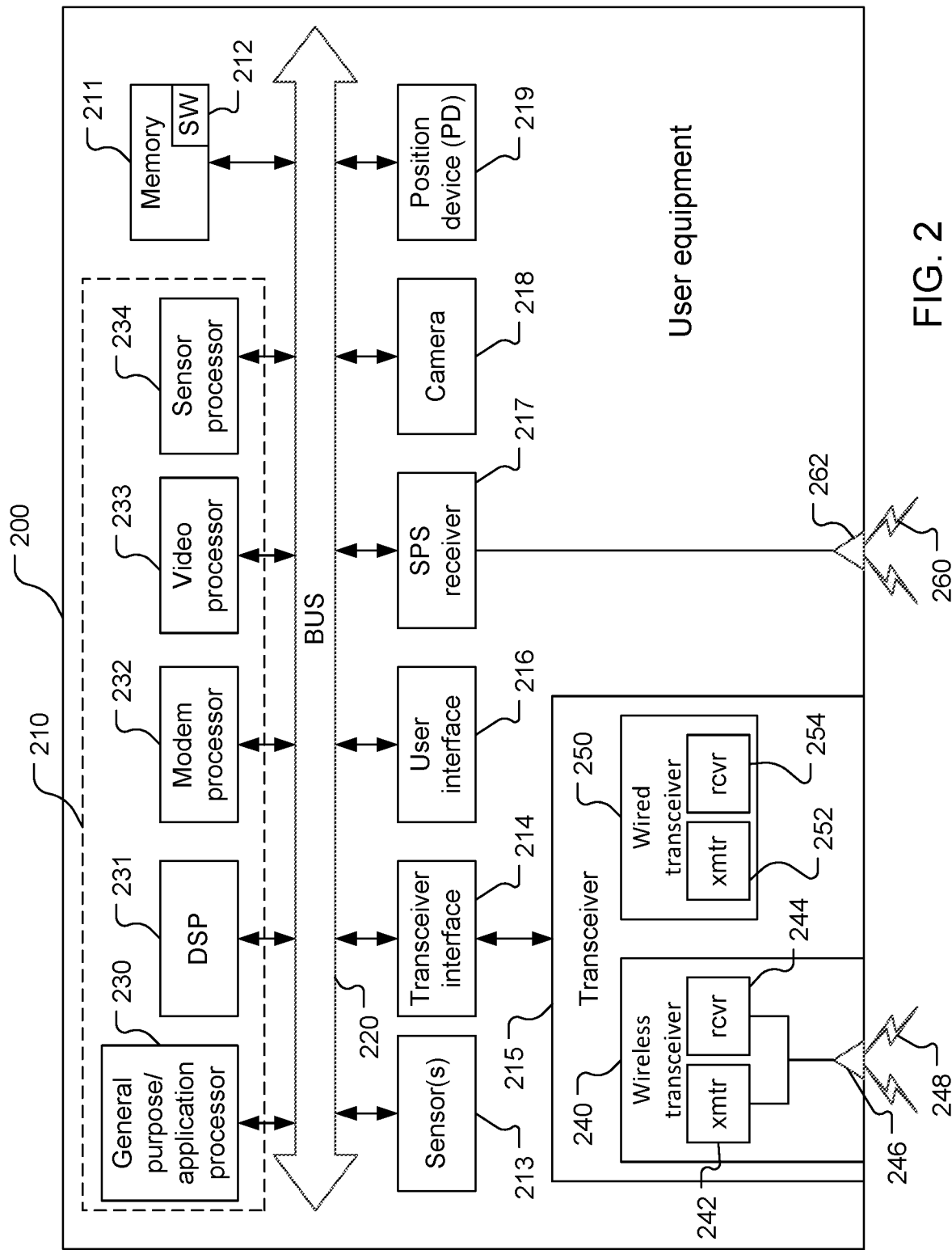
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
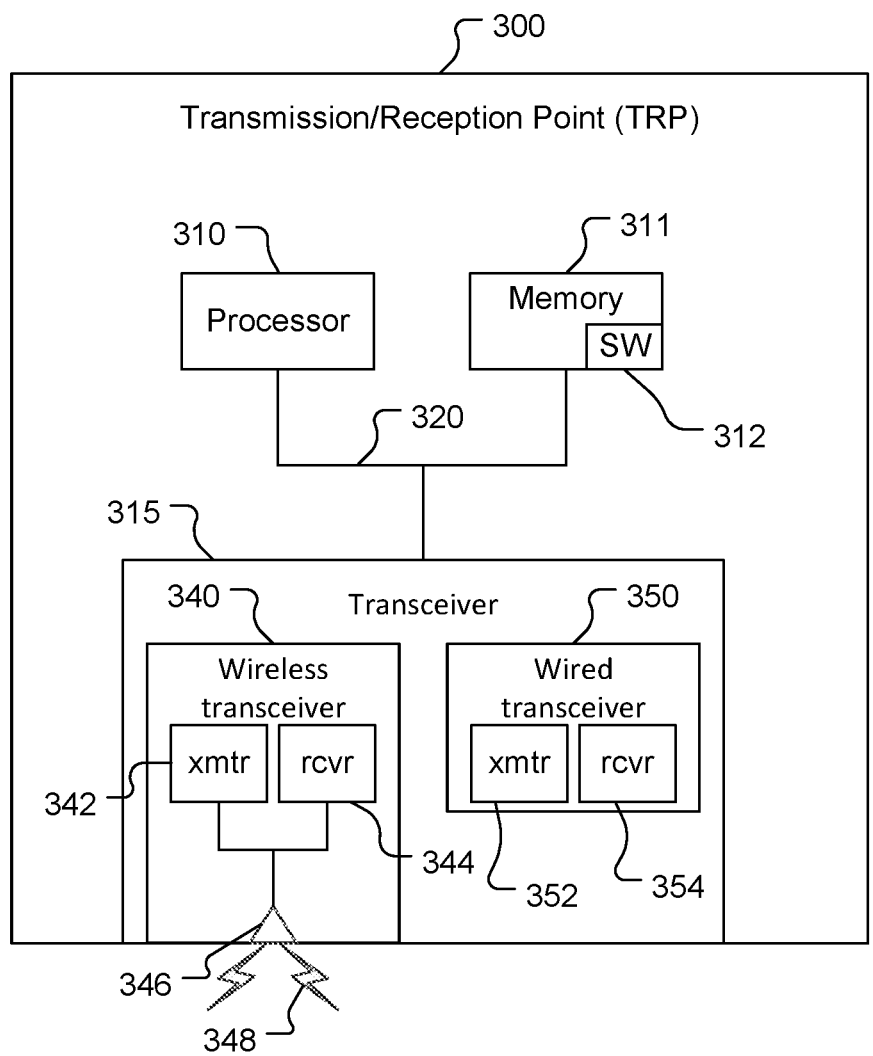
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
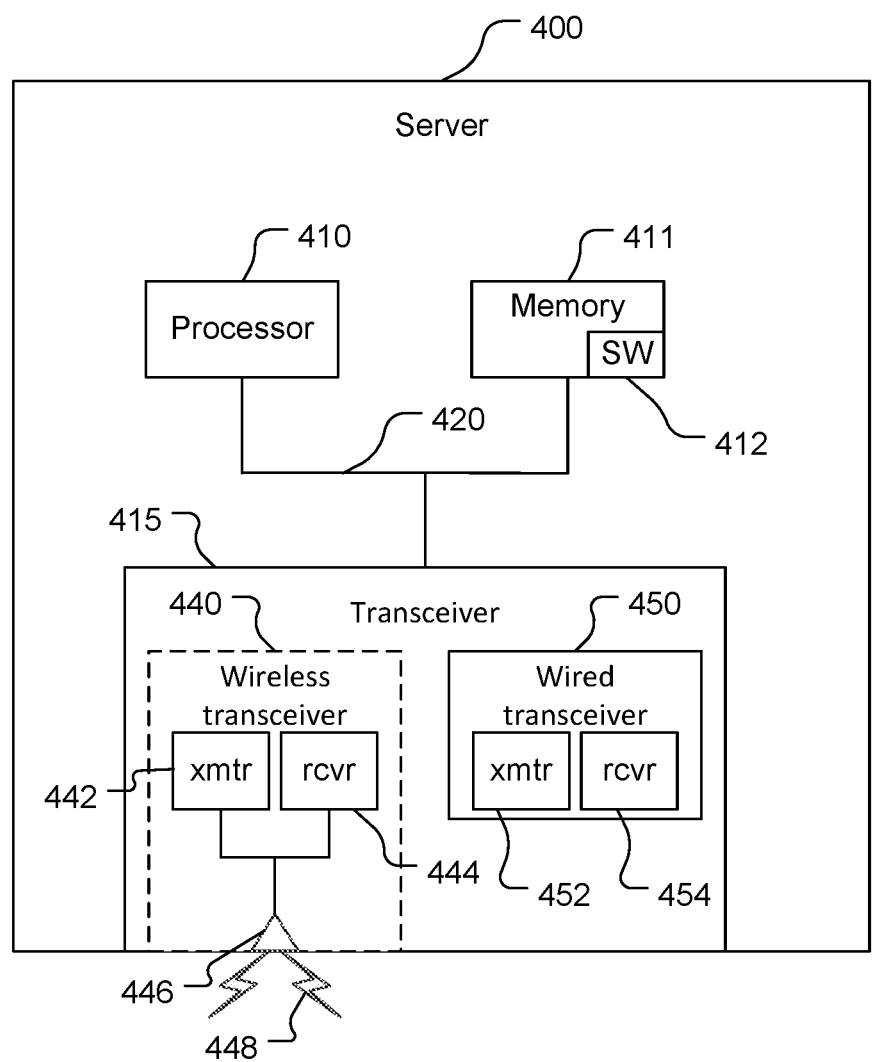
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Angular (AoA, AoD) Relationship Determination

Angular relationships between entities, e.g., AoA at a receiver and/or AoD from a transmitter, is useful information with many applications. For example, the direction of a target device relative to a reference device may be used for positioning (determining a position estimate) of the target device if the location of the reference device is known, for beam refinement (e.g., selection of a beam for use in communicating with the target device), etc.

Figure 5:
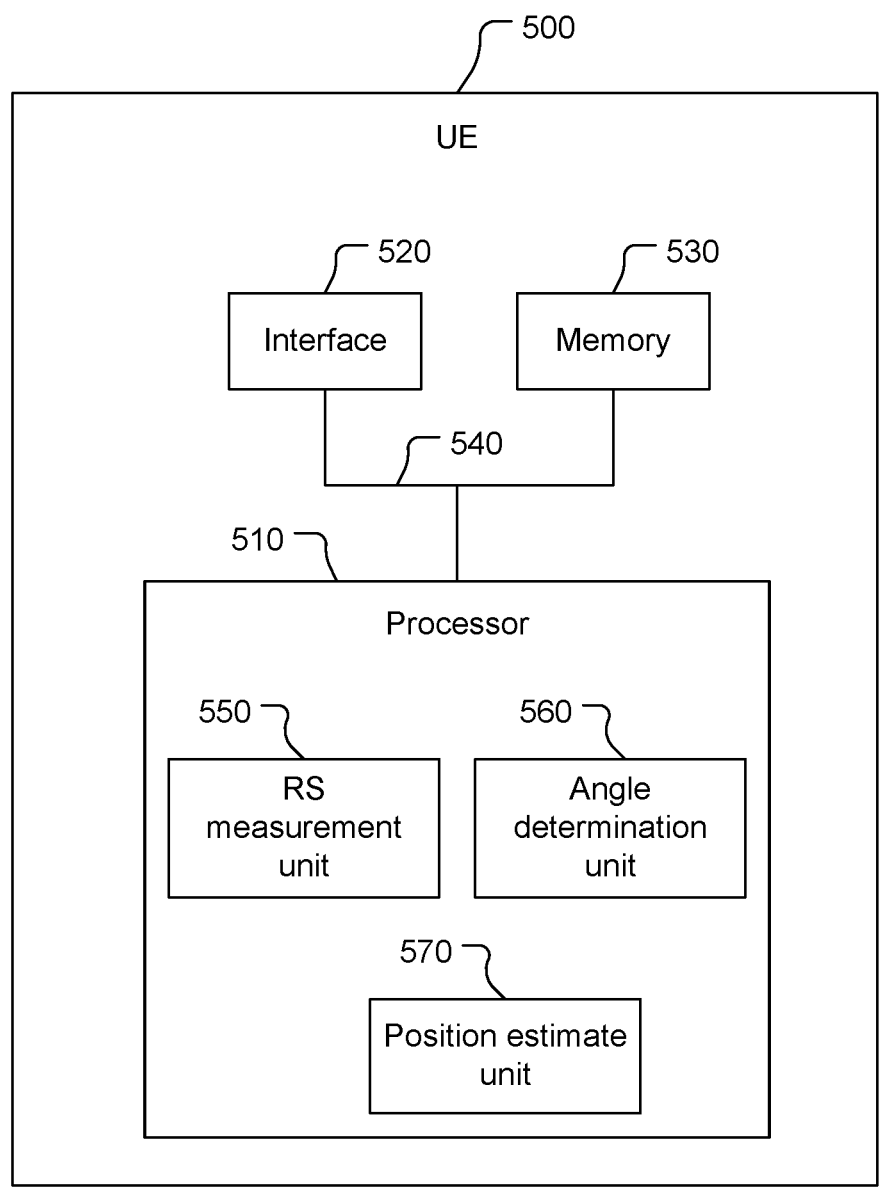
FIG. 5 is a block diagram of an example user equipment.

Referring to FIG. 5, with further reference to FIGS. 1-4, a UE 500 includes a processor 510, a transceiver 520, and a memory 530 communicatively coupled to each other by a bus 540. The UE 500 may be any of a variety of types of devices, e.g., a laptop computer, a tablet computer, a smartphone, etc. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a reference signal measurement unit 550, may include an angle determination unit 560, and may include a position estimate unit 570. The reference signal measurement unit 550, the angle determination unit 560, and the position estimate unit 570 are discussed further below, and the description may refer to the processor 510 generally, or the UE 500 generally, as performing any of the functions of the reference signal measurement unit 550, the angle determination unit 560, and/or the position estimate unit 570 and the UE 500 is configured to perform the functionality of the reference signal measurement unit 550, the angle determination unit 560, and the position estimate unit 570.

Figure 6:
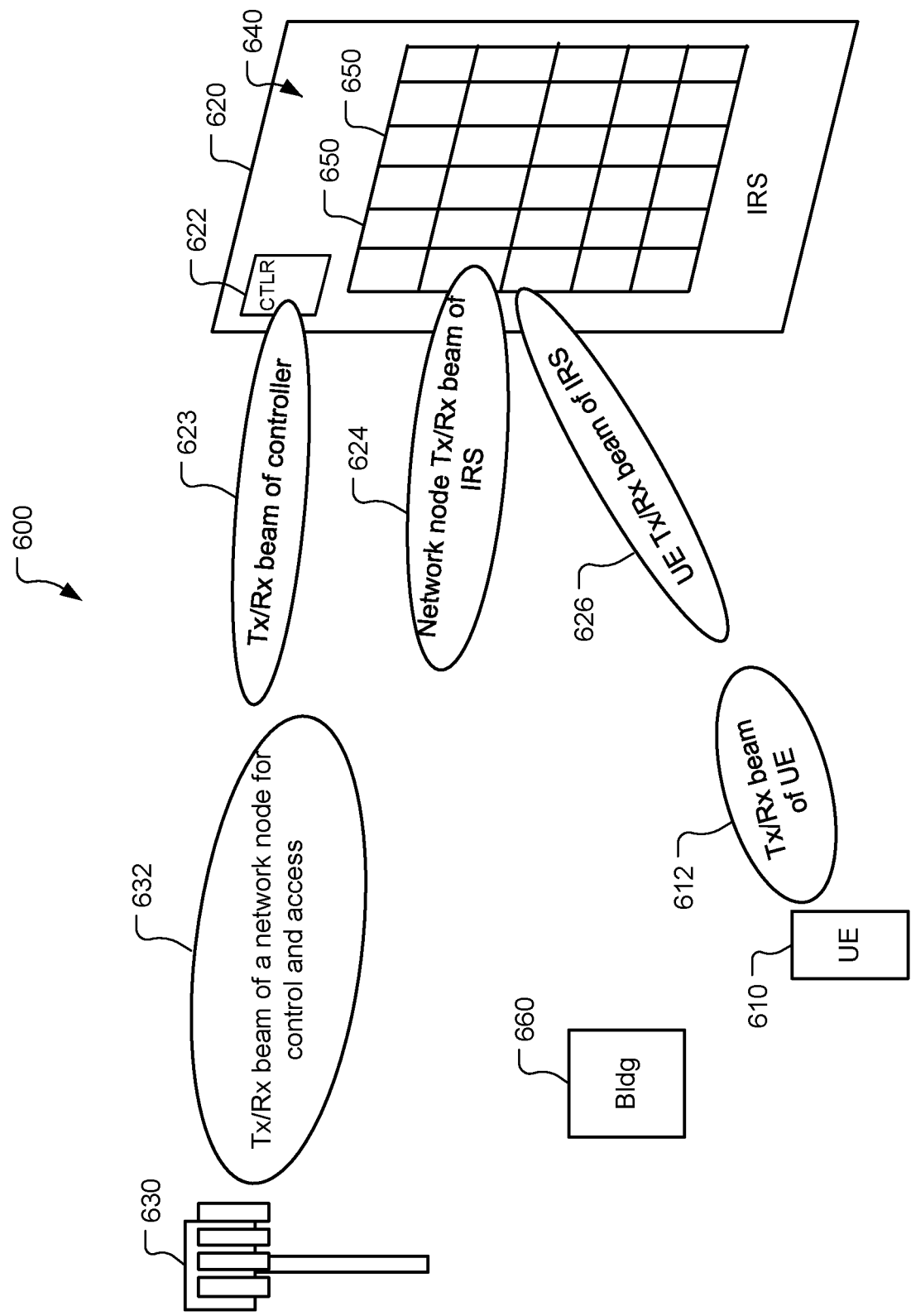
FIG. 6 is a simplified diagram of a communication environment including a base station, a user equipment, and an intelligent reflecting surface.

Referring to FIG. 6, a communication environment 600 includes a UE 610, an intelligent reflecting surface (IRS) 620, a network node 630, and a building 660. Intelligent reflecting surfaces are also known as reconfigurable intelligent surfaces (RISes). The IRS 620 includes a surface 640 with surface elements 650, e.g., that are small and densely packed. Each surface element 650 may have a controllable reflection coefficient. By adjusting the reflection coefficient, a phase shift between an incident and a reflected ray to and from the surface element, respectively, may be controlled. The phase shift may be controlled by adjusting the reflection coefficient to adjust a beam shape and/or direction. Depending on the implementation, the surface elements 650 may also be referred to as metaatoms. The IRS 620 may be controlled by a controller 622, which may be configured based on an IRS configuration message received from the network node 630. Thus, the reflection coefficient may be adjusted by the controller 622 based on one or more instructions received by the controller, e.g., in a beam 623, from the network node 630.

When the surface phase (that is, the phases of the surface elements 650) is properly set, a signal in a beam 632 from the network node 630 may be received by a beam 624 of the IRS 620 and reflected by the IRS 620 in a beam 626 toward the UE 610 in downlink and received via a beam 612 of the UE 610. In uplink, a signal may be transmitted in the beam 612 of the UE 610, received via the beam 626, reflected by the IRS 620 in the beam 624 toward the network node 630, and received via the beam 632. The IRS 620 may help to reduce pathloss and avoid blockages in line-of-sight (LOS) propagation between the network node 630 and the UE 610, e.g., due to the building 660. The network node 630 may be any of a base station, a remote radio head (RRH), a repeater, etc. The discussion herein may be described in relation to 5G and millimeter wave (mmW) bands, but the discussion is applicable to other technologies such as 4G LTE, IEEE 802.11 WIFI, or future generations of technologies including beyond 5G, 6G, etc., and to other bands such as the sub-6 GHz bands, terahertz bands, etc.

One or more aspects described herein may relate to methods for initial acquisition and beam refinement using beams reflected from an IRS. During initial acquisition, the base station may perform a beam sweep of reference signal beams (e.g., SSB beams). A beam sweep may include transmitting, sequentially, multiple beams associated with different configurations, so that the most suitable configuration may be identified. When an RS beam falls onto an IRS, the IRS may reflect the incident RS beam toward one or more UEs so that the UEs that are within the coverage area of the IRS may perform initial acquisition and a subsequent random access.

Subsequent to initial acquisition, a beam refinement procedure may be performed at an IRS in relation to a UE to find the UE, e.g., so that the IRS can focus a beam on the UE. A refined beam from the IRS may be a narrower beam (than the SSB wide beam) that is more suitable for the communication with the UE. In an example implementation, beam refinement may be performed based on wide beams of gradually reduced angular spread. The most suitable candidate refined beam may be selected based on RSRP measurements from the UE. The RSRP measurements may be based, for example, on SSBs, CSI-RSs, or SRSs.

A wide RS beam for initial acquisition may benefit one UE or more than one UEs at once. All UEs within the coverage area of the wide beam may benefit from the wide beam. The beam refinement procedure including the use of narrower wide beams (e.g., based on SSBs, CSI-RSs, or SRSs) may benefit one UE or more than one UEs at once.

In an example implementation, four iterations may be performed in the beam refinement procedure. The angular spread of the candidate beams in each successive iteration may be, respectively, 30 degrees, 15 degrees, 7.5 degrees, and 3 degrees. In another example implementation, three iterations may be performed in the beam refinement procedure. The angular spread of the candidate beams in each successive iteration may be, respectively, 60 degrees, 15 degrees, and 4 degrees.

The IRS 620 may form a beam focused on a UE. For example, the IRS 620 may form the beam 626 specific to the UE 610. To form a beam focused on a UE, a radial distance of the UE from the IRS may be identified based on any of a variety of techniques such as a channel estimation method. The channel estimation method may be used to further refine the beam for a UE, and/or to estimate the radial distance of the UE or the phase offset to the UE. For example, an RTT and/or an RSRP may be determined based on signal exchange with the UE 610 and the RTT and/or the RSRP used to determine the distance between the IRS 620 and the UE 610.

Figure 7:
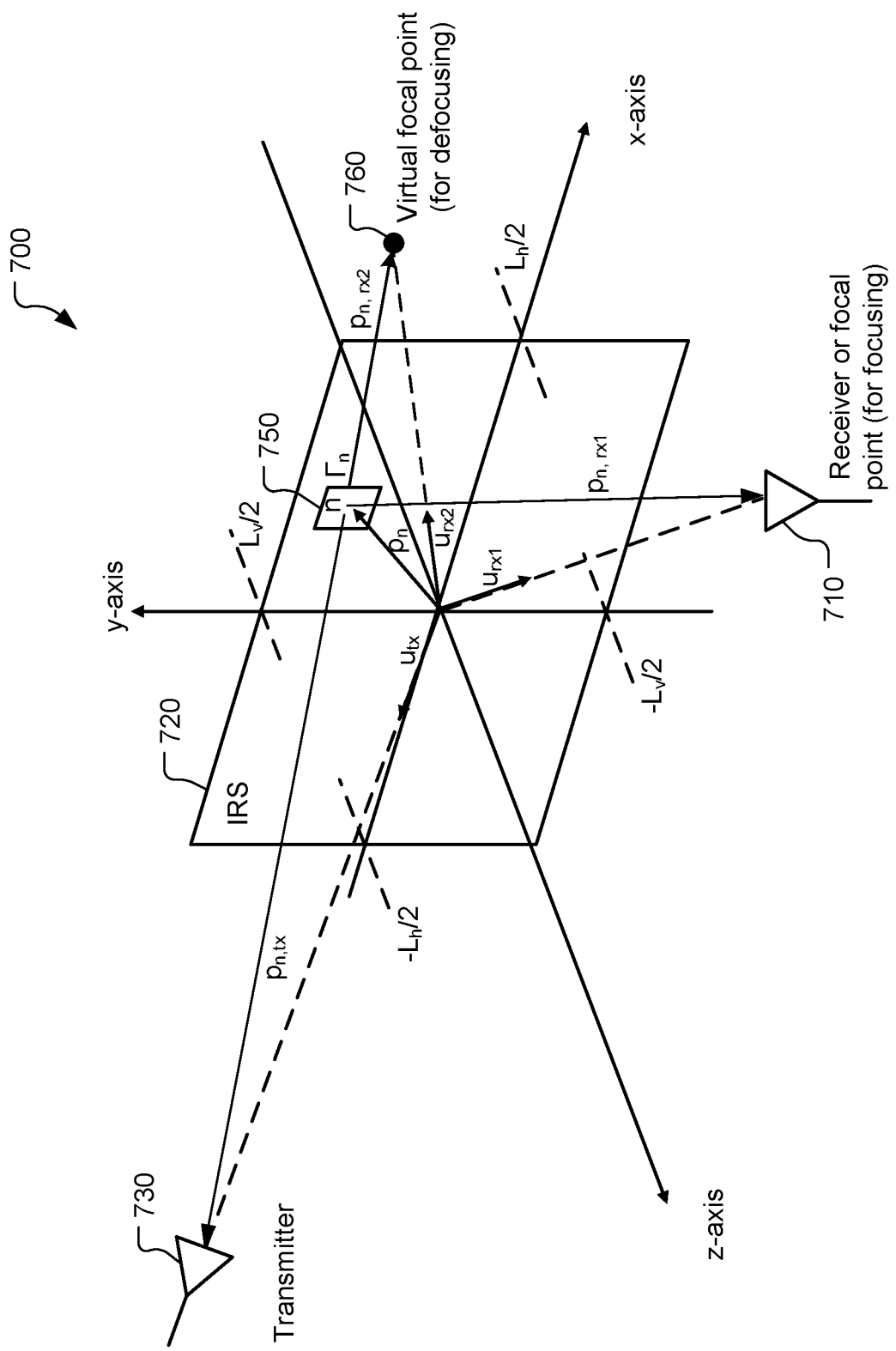
FIG. 7 is a perspective view of transmissions between a transmitter and a receiver via an intelligent reflecting surface.

Referring also to FIG. 7 an environment 700 for signal transmission and reflection includes a receiver 710, an IRS 720, and a transmitter 730. The IRS 720 may be used in focusing signals to the receiver 710. The IRS 720 may implement a focusing operation to beamform toward the receiver 710 (e.g., a UE), where phases of received rays may align. Unlike open-loop beamforming, focusing may take into account the radial distance of the receiver 710 from the IRS 720, in addition to the azimuth and the elevation of the receiver 710 relative to the IRS 720. Focusing may be achieved by setting the surface phase of the IRS 720 in a particular way. The IRS 720 may defocus signals, e.g., by setting a phase surface of a signal such that the signal appears to originate from a virtual focal point, thus producing a wide beam.

As illustrated, various parameters are defined for the environment 700. In particular, the following parameters are defined: $p_{n,tx}$ is a vector from (a center of) a surface element 750 (the $n^{th}$ surface element) to a point of transmission of a signal from the transmitter 730; $p_{n,rx1}$ is a vector from the surface element 750 to the receiver 710; $p_{n,rx2}$ is a vector from the surface element 750 to a virtual focal point 760 of a virtual receiver; $p_n$ is a vector from the origin (at a center of the IRS 720) to the surface element 750; $u_{tx}$ is a unit vector from the origin to the transmitter 730; $u_{rx1}$ is a unit vector from the origin to the receiver 710; $u_{rx2}$ is a unit vector from the origin to the virtual focal point 760; $\Gamma_n$ is a reflection coefficient at the surface element 750; $L_v$ is a vertical length of the IRS 720; and $L_h$ is a horizontal length of the IRS 720.

The reflection coefficient of each of the surface elements to focus a signal from the transmitter 730 as desired, e.g., to the receiver 710. To focus from a signal from the transmitter 730 to the receiver 710, the reflection coefficient may be set according to $$\Gamma_n = \exp(j2\pi(d_{n,tx}+d_{n,rx})/\lambda) \tag{1}$$

where $d_{n,tx}=|p_{n,tx}|$ and $d_{n,rx}=|p_{n,rx1}|$, and $\lambda$ is the operating wavelength of the signal transmitted by the transmitter 730. To focus at infinity (which may form a narrow beam), $\Gamma_n$ may be factorized as:

$$\Gamma_n = \Gamma^{tx}_n \Gamma^{rx}_n \tag{2}$$

$$\text{where } \Gamma^{tx}_n = \exp(j2\pi d_{n,tx}/\lambda) \tag{3}$$

$$\text{and } \Gamma^{rx}_n = \exp(j2\pi d_{n,rx}/\lambda) \tag{4}$$

The calculations may be used for either or both of $\Gamma^{tx}_n$ and $\Gamma^{rx}_n$. On the transmitter side, $$d_{n,tx} = -\langle p_n, u_{tx} \rangle \tag{5}$$

On the receiver side (which applies to the real focal point "rx1")

$$d_{n,rx} = -\langle p_n, u_{rx1} \rangle \tag{6}$$

Defocusing may be used for uplink or downlink signals, but may be used more often for downlink than for uplink. To defocus a beam, the negative of the distance from the surface element 750 to the virtual focal point 760 is used as given by $$d_{n,rx} = -|p_{n,rx2}| \tag{7}$$

which produces a wide beam. A defocused wide beam will appear as if the signal was transmitted by a transmitter located at the virtual focal point 760. The IRS 720 may defocus on an azimuthal plane and focus at infinity in elevation by ignoring a y-component (with the x-z plane in FIG. 7 assumed to be parallel to a tangent to the surface of the Earth) when computing $d_{n,rx}$. The width (e.g., the angular spread) of a defocused wide beam may be adjusted by adjusting the radial distance of the virtual focal point 760 to the IRS 720. The direction of a defocused wide beam may be adjusted by adjusting the horizontal and/or vertical positions of the virtual focal point 760 relative to the IRS 720.

Focusing and defocusing may be used in combination. In one example, the IRS 720 may focus (at a finite point or at infinity) on uplink (or downlink), and may defocus on downlink (or uplink), with uplink and downlink being time-division multiplexed. In another example, the IRS may focus (at a finite point or at infinity) in azimuth (or elevation), and may defocus in the other dimension (i.e., elevation (or azimuth), respectively).

Figure 8:
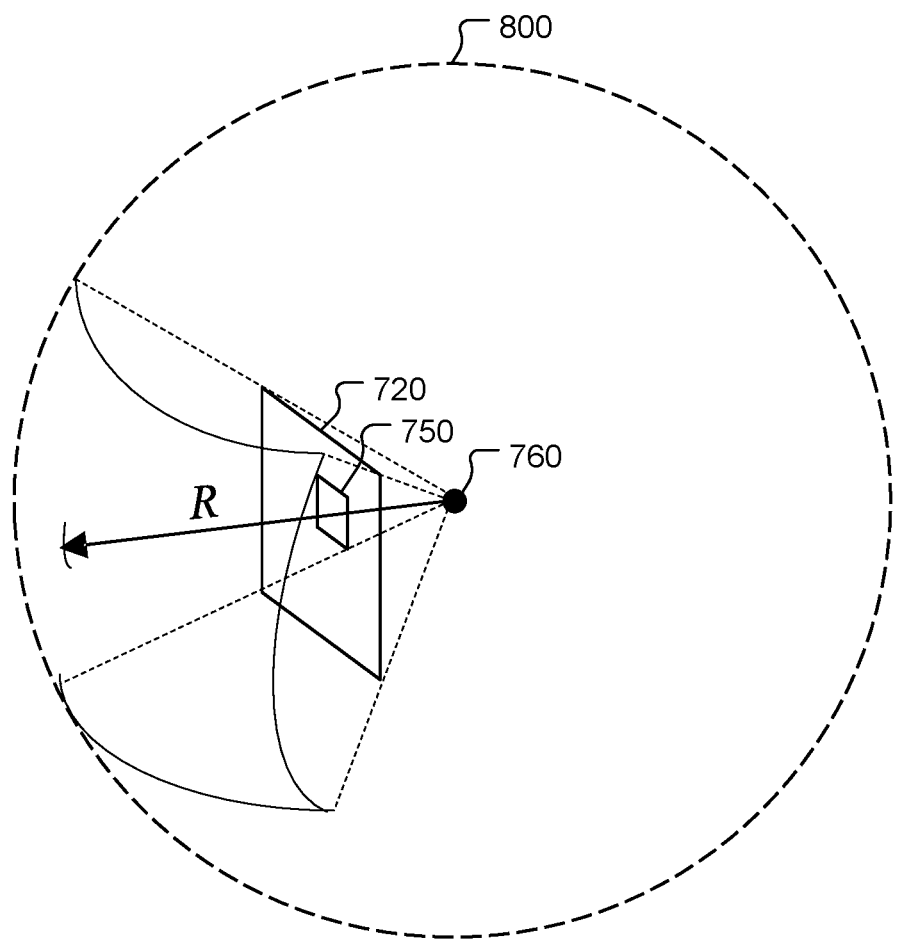
FIG. 8 is a perspective view of beam defocusing in multiple dimensions.

Referring also to FIG. 8, the IRS 720 is used to defocus a beam in both azimuth and elevation. Defocusing in azimuth and elevation may be equivalent to reflecting incident rays so that the phase front of the reflected beam forms a sphere around the virtual focal point 760. The energy may dissipate quickly as the distance increases because the energy is dissipated in three dimensions. More generally, the phase front may be an ellipsoid. Defocusing in both azimuth and elevation may be accomplished by setting the IRS surface reflection coefficient according to $$\Gamma_n = \exp(j2\pi(d_{n,tx}+(R-d_{n,rx}))/\lambda) \tag{8}$$

where R is an arbitrary radius of a sphere 800 centered at the virtual focal point 760, $d_{n,tx}$ is a distance from the transmitter 730 to the $n^{th}$ surface element of the IRS 720, and $d_{n,rx}$ is a distance from the virtual focal point 760 to the $n^{th}$ surface element of the IRS 720. Because the presence of the arbitrary radius R adds an arbitrary constant phase offset (which does not affect the desired result), the radius R may be dropped. Hence, the IRS surface reflection coefficient may be given by $$\Gamma_n = \exp(j2\pi(d_{n,tx}-d_{n,rx})/\lambda) \tag{9}$$

Figure 9:
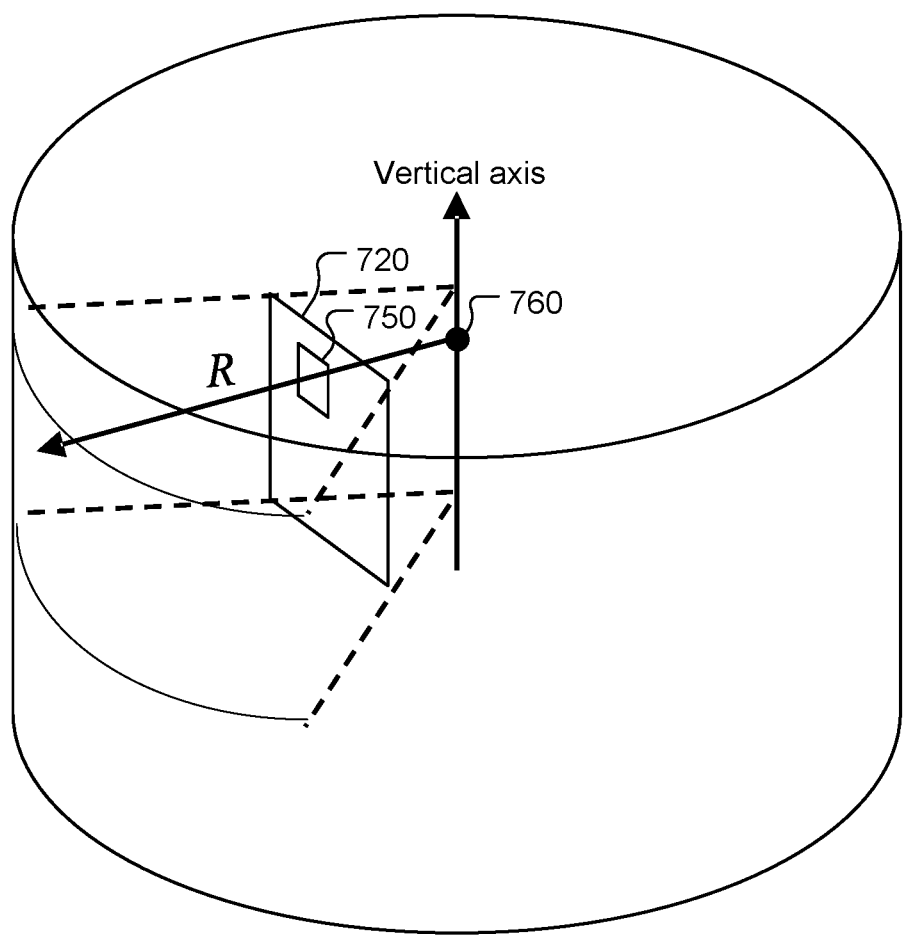
FIG. 9 is a perspective view of beam defocusing in azimuth while focusing at infinity in elevation.

Referring also to FIG. 9, the IRS 720 is defocusing in azimuth while focusing at infinity in elevation. Defocusing in azimuth, while focusing at infinity in elevation, may be equivalent to reflecting incident rays so that a phase front of the reflected beam forms a cylindrical surface around the virtual focal point 760. The energy may dissipate less quickly than defocusing in azimuth and elevation as the distance increases because the energy is dissipated in two dimensions. Defocusing in azimuth while focusing at infinity in elevation may be accomplished by setting the IRS surface reflection coefficient according to $$\Gamma_n = \exp(j2\pi(d_{n,tx}+(R-d'_{n,rx}))/\lambda) \tag{10}$$

where $d'_{n,rx}$ is the "horizontal" distance from the virtual focal point to the surface element 750, e.g., by ignoring a vertical displacement of the virtual focal point 760 and the surface element 750. Because the presence of the arbitrarily chosen radius R adds an arbitrary constant phase offset (which does not affect the desired result), the radius R may be dropped. Hence, the IRS surface reflection coefficient may be given by $$\Gamma_n = \exp(j2\pi(d_{n,tx}-d'_{n,rx})/\lambda) \tag{11}$$

The concept may be further generalized to defocusing in azimuth while focusing at a finite point (instead of infinity) in elevation or, alternatively, also defocusing in elevation, but with a different angular spread. This may be accomplished by suitably modifying the computation of $d'_{n,rx}$ based on the desired wavefront. FIGS. 8 and 9 illustrate examples based on the assumption that the defocused beams are pointing towards zero azimuth and elevation, but beams may be turned towards other azimuth directions and/or other elevation directions by moving the virtual focal point to non-central locations.

Phase differences may be used to determine an angular relationship between a signal transmitter and a signal receiver. The discussion herein uses the IRS 720 as an example of the transmitter but other implementations of transmitters may be used that provide beams with different virtual focal points. For example, a base station may be used to transmit defocused beams with different virtual focal points, e.g., by setting phase shifts of a densely-packed array of antenna elements as discussed herein. Also, the discussion herein uses the UE 500 as an example of a receiver, but other types of receivers may be used. Also, the discussion herein uses examples of different virtual focal points that are displaced by orthogonal distances in a first reference direction and a second reference direction, wherein the first and second reference directions may be orthogonal and may define a plane that is substantially parallel to a surface of the IRS 720, but other displacements may be used. For example, virtual focal points may be displaced from each other in directions that are not orthogonal to each other and/or in directions other than an azimuthal direction (tangent to a surface of the Earth) and/or an elevational direction (normal to the surface of the Earth). Phase differences of signals corresponding to the different virtual focal points may be used to determine first and second reference angles from the IRS 720 to the signal receiver, e.g., angles relative to a surface of the IRS 720 to the signal receiver, with the angles being in different planes, each normal to the surface of the IRS 720.

Figure 10:
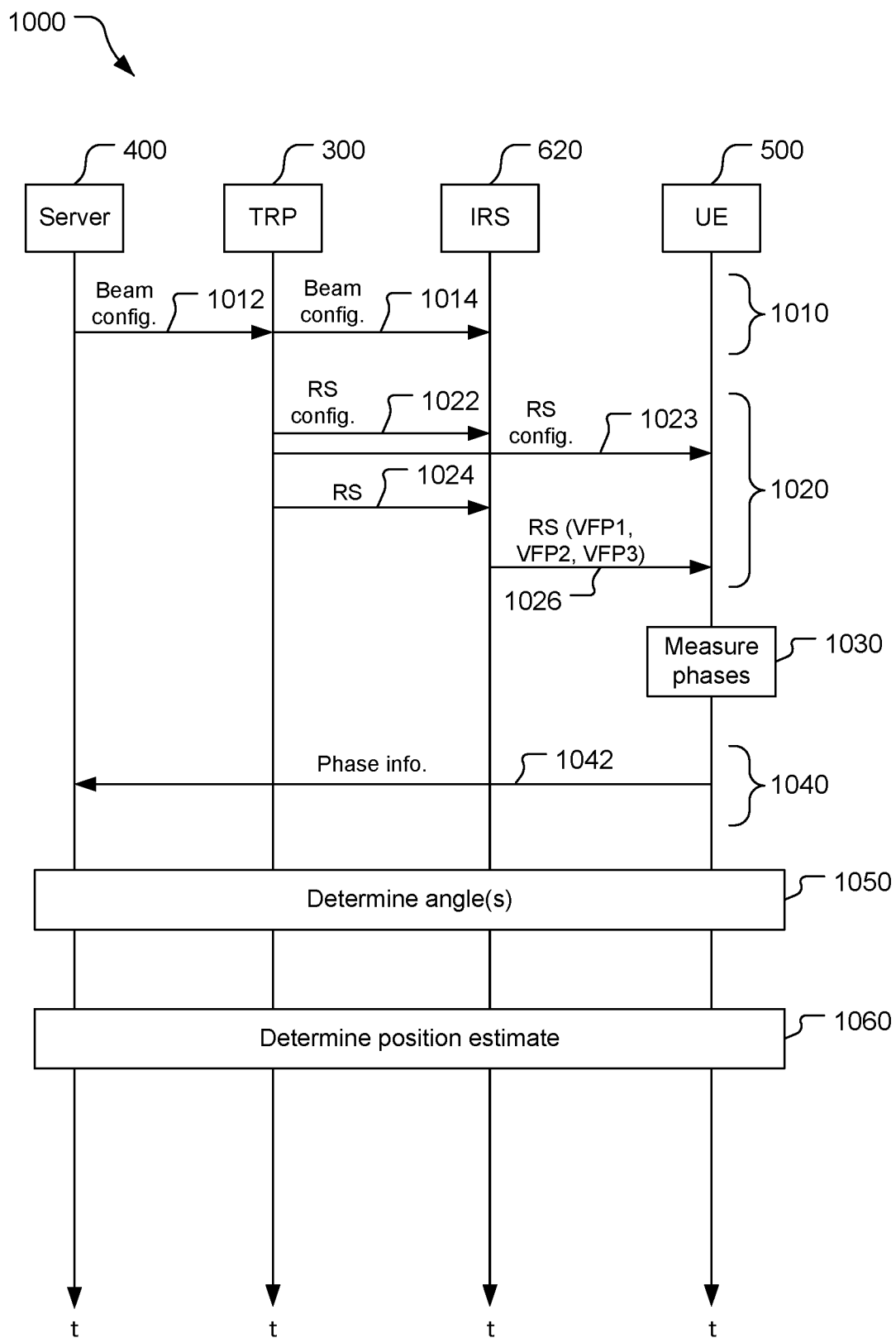
FIG. 10 is a signaling and process flow for determining angle between a transmitter and a wireless signaling device, and possibly determining position information for the receiver.

Referring also to FIG. 10 with further reference to FIGS. 1-9, 11, and 12, a signaling and process flow 1000 for determining angle between a transmitter and a wireless signaling device (here the UE 500), and possibly determining position information for the receiver, includes the stages shown. The flow 1000 is an example only, as stages may be added, rearranged, and/or removed. For example, one or more of stages 1040 and 1060 may be omitted as discussed below. Any of the stages shown and discussed may be modified, e.g., to include more or fewer actions, or to provide more or less or different information, etc.

At stage 1010, the server 400 transmits a beam configuration message 1012 to the TRP 300. The server 400 may transmit the beam configuration message 1012 via the wired transmitter 452 and/or the wireless transmitter 442 and the antenna 446 to the TRP 300. The beam configuration message 1012 may instruct the TRP 300 to reflect signals with multiple virtual focal points. The instruction may be explicit or implicit (e.g., a request for determination of angular relationship between the UE 500 and the IRS 620). The beam configuration message 1012 may, for example, provide a general request or instruction and the TRP 300 may be configured to determine the virtual focal points to use and determine the corresponding reflection coefficient values for the surface elements of the IRS 620. As another example, the beam configuration message 1012 may provide locations of the virtual focal points that may be used (e.g., by the TRP 300 and/or the IRS 620, e.g., the controller 622) to determine the reflection coefficient values. As another example, the beam configuration message 1012 may include the reflection coefficient values for reflecting beams with corresponding virtual focal points. If an entity other than the server 400 (e.g., the TRP 300 and/or the UE 500) may calculate the angular relationship between the UE 500 and the IRS 620, then the beam configuration message 1012 may include indications of the virtual focal points even if the beam configuration message 1012 would not include indications of the virtual focal points otherwise.

In response to receiving the beam configuration message 1012, the TRP 300 transmits a beam configuration message 1014 to the IRS 620. For example, the TRP 300 may receive the beam configuration message 1012 via the wired receiver 354 and/or the antenna 346 and the wireless receiver 344 and relay the beam configuration message 1012 as the beam configuration message 1014. As another example, the TRP 300, e.g., the processor 310, may determine one or more configuration parameters for the beam configuration message 1014 based on the beam configuration message 1012. The TRP 300 may, for example, determine reflection coefficients based on a general instruction to reflect reference signals with different virtual focal points. As another example, the TRP 300 may compute reflection coefficients based on a specific instruction to reflect reference signals with different, specified virtual focal points. If an entity other than the TRP 300 (e.g., the UE 500) may calculate the angular relationship between the UE 500 and the IRS 620, then the beam configuration message 1014 may include indications of the virtual focal points even if the beam configuration message 1014 would not include indications of the virtual focal points otherwise.

In response to receiving the beam configuration message 1014, the IRS 620 establishes the reflection coefficients for reflecting reference signals at the appropriate virtual focal points. For example, the controller 622 may receive the reflection coefficients, or calculate the reflection coefficients based on a general request or a request for specified virtual focal points.

Figure 11:
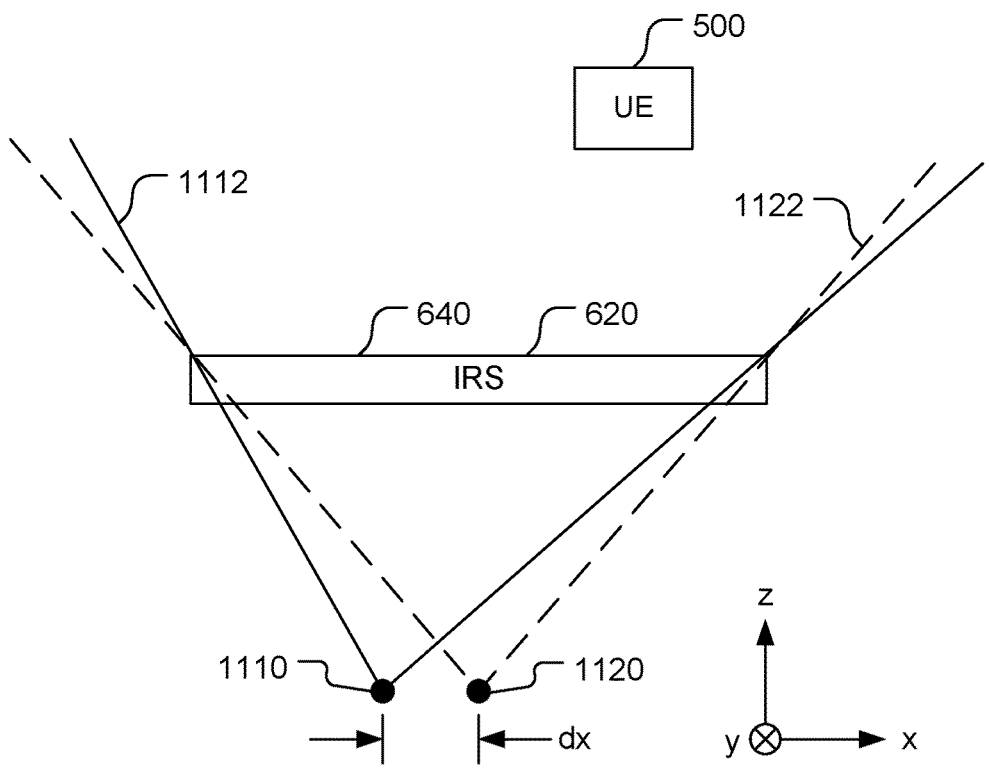
FIG. 11 is a simplified top view of an intelligent reflecting surface transmitting defocused beams with two different virtual focal points.
Figure 12:
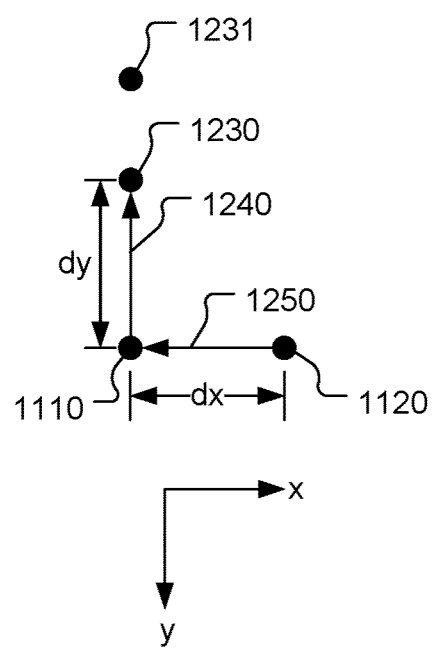
FIG. 12 is a simplified diagram of three virtual focal points displaced from each other in two dimensions.

As shown in FIGS. 11 and 12, the virtual focal points may include a first virtual focal point 1110, a second virtual focal point 1120, and a third virtual focal point 1230. By reflecting reference signals with appropriate reflection coefficients, the IRS 620 transmits signals in defocused, wide beams 1112, 1122 that appear as though the beams originated from the virtual focal points 1110, 1120 respectively (with a defocused beam for the virtual focal point 1230 not being shown). The angular extent of the beams 1112, 1122 depends on distances of the virtual focal points 1110, 1120 from the surface 640 of the IRS 620. The first virtual focal point 1110 corresponds to the first reference signal that the IRS 620 will defocus, the second virtual focal point 1120 corresponds to the second reference signal that the IRS 620 will defocus, and the third virtual focal point 1230 corresponds to the third reference signal that the IRS 620 will defocus (although the order could be changed). The first, second, and third reference signals are time-division multiplexed, e.g., being from different slots or different symbols within a slot, even if of the same reference signal (e.g., an SSB, a CSI-RS, etc.), or multiple different reference signals may be used, but in either case the signal(s) are referred to herein as separate reference signals. The second virtual focal point 1120 is displaced from the first virtual focal point 1110 by a distance that is, in this example, parallel to the x-axis (tangent to a surface of the Earth at the first and second virtual focal points 1110, 1120) and thus is labeled dx (for delta distance in the x direction; in this example, the positive x direction). The third virtual focal point 1230 is displaced from the first virtual focal point 1110 by a distance that is, in this example, parallel to the y-axis (normal to a surface of the Earth at the first virtual focal point 1110) and thus is labeled dy (for delta distance in the y direction; in this example, the negative y direction). The distances dx, dy may be the same or different. Directions 1240, 1250 of the second virtual focal point 1120 and the third virtual focal point 1230 relative to the first virtual focal point 1110 are different, and in this example orthogonal to each other (being parallel to the x-axis and the y-axis, respectively). Directions from an initial virtual focal point to subsequent (displaced) virtual focal points may not be orthogonal to each other, but using virtual focal points such that the directions are orthogonal reduces the complexity of the math, relative to directions that are not orthogonal, for determining an angular relationship of the UE 500 to the IRS 620. Further, the third virtual focal point 1230 may be displaced parallel to the y-axis from the second virtual focal point 1120 instead of from the first virtual focal point 1110, but the math is simpler with the third virtual focal point 1230 displaced from the first virtual focal point 1110 orthogonally to the displacement of the second virtual focal point 1120 from the first virtual focal point 1110. Also, the directions of the second virtual focal point 1120 and the third virtual focal point 1230 from the first virtual focal point 1110, even if orthogonal, may not be parallel and normal to a surface of the Earth (e.g., if a plane of the surface 640 of the IRS 620 is not normal to the surface of the Earth) or to the surface 640 of the IRS 620, but being orthogonally disposed simplifies calculations for determining angles as discussed herein.

Figure 13A:
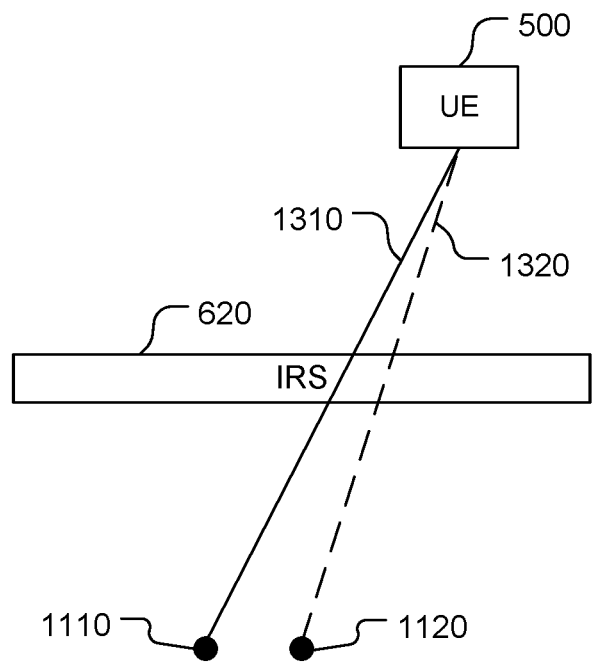
FIG. 13A is a simplified top view of defocused signals with the virtual focal points shown in FIG. 11 being received by a user equipment.
Figure 13B:
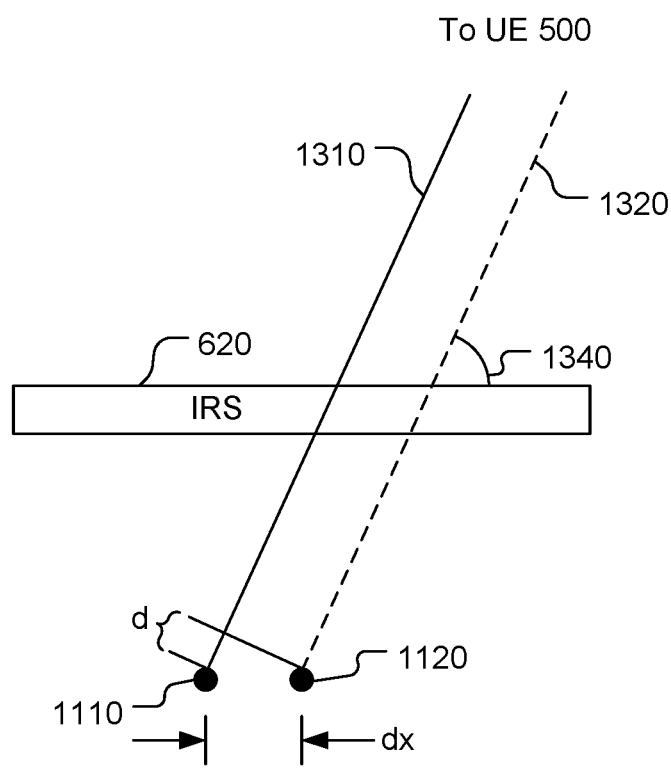
FIG. 13B is a portion of the simplified top view of defocused signals shown in FIG. 13A.

Referring also to FIGS. 13A, 13B, the distances between the virtual focal points 1110, 1120 and of the virtual focal points 1110, 1230, in this example, dx and dy, may be less than a half of a wavelength of a frequency of the reference signal(s) reflected by the IRS 620. In FIGS. 13A, 13B, the TRP 300 and the reference signals between the TRP 300 and the IRS 620 are not shown in order to simplify the figure. A reference signal 1310 is reflected with the virtual focal point 1110 and a reference signal 1320 is reflected with the virtual focal point 1120 (and a reference signal for the virtual focal point 1230 not being shown). Paths of the reference signals 1310, 1320 in FIG. 13A appear not to be parallel, but due to the actual distances involved (e.g., less than half a wavelength separations of the virtual focal points 1110, 1120 and distance to the UE 500 of tens or hundreds of wavelengths), the paths of the reference signals 1310, 1320 are approximately parallel as shown in FIG. 13B and may be treated as parallel. With the distances dx, dy less than half of a wavelength, an integer ambiguity (i.e., an ambiguity in the number of full cycles of the measured phases) will be avoided being introduced by use of the different virtual focal points. That is, a path from transmitter to receiver using the first virtual focal point 1110 will be less than one-half of a wavelength different (longer or shorter) than a path from transmitter to receiver using the second virtual focal point 1120, assuming there is not significant motion of the transmitter, receiver, or IRS 620 between transmissions using the different virtual focal points. Avoiding introducing an integer ambiguity (i.e., an ambiguity in the number of carrier cycles of the reference signal between transmitter and receiver) helps a difference in phase measurement at the receiver of the two reference signal transmissions using the different virtual focal points be used to determine an angular relationship between the IRS 620 and the UE 500. As shown, a distance difference of the paths of the reference signals 1310, 1320 from the virtual focal points 1110, 1120 to the UE 500 is d, and in terms of the phase difference, $\Delta\phi$, of the phases of the reference signals measured at the UE 500, d is given by $$d = \lambda * \left(\frac{\Delta\phi}{2\pi}\right) \quad (12)$$

where $\lambda$ is the wavelength of the reference signals 1310, 1320 and the phase difference $\Delta\phi$ is within $[-\pi, \pi]$. If the value of d is negative, then the virtual focal point would be in the negative x direction (per the coordinate system shown in FIG. 11). A reference angle 1340 corresponding to the measured phase difference of the reference signals 1310, 1320 (corresponding to the virtual focal points 1110, 1120), is an angle of the UE 500 relative to the surface 640 of the IRS 620 and is given by $$\theta = \cos^{-1}\left(\frac{d}{dx}\right) \quad (13)$$

where $\theta$ is the reference angle 1340. The reference angle 1340 may be related to an azimuthal angle depending on the orientation of the IRS 620 and the orientation of the virtual focal points 1110, 1120. The reference angle 1340 may be converted to a desired coordinate system, e.g., relative to the Earth (to be an azimuthal angle), to a coordinate system relative to the UE 500, etc. Another reference angle may be determined using other virtual focal points, e.g., the virtual focal points 1110, 1230. This reference angle may be related to an elevation angle, and may be converted to a desired coordinate system. The reference angle 1340, or the reference angle corresponding to the virtual focal points 1110, 1230, or a combination of these reference angles, provide an angular relationship of the IRS 620 and the UE 500.

At stage 1020, the TRP 300 transmits one or more reference signal configurations and reference signals, and the IRS 620 reflects the reference signals with different virtual focal points to the UE 500. The TRP 300 negotiates with the server 400 to determine a schedule of reference signals. The TRP 300 transmits an RS configuration 1022 to the IRS 620, e.g., to the controller 622, indicating the schedule of reference signals. The RS configuration 1022 may indicate which reference signals are to be reflected with each of the virtual focal points 1110, 1120, 1230, or this information may be conveyed separately from the RS schedule. Also or alternatively, the controller 622 may determine which reference signals are to be reflected with each of the virtual focal points 1110, 1120, 1230, and provide this information to the entity (e.g., the UE 500, the server 400, the TRP 300) that will be determining the angular relationship between the IRS 620 and the UE 500. The IRS 620 transmits an RS configuration 1023 to the UE 500 indicating the RS schedule. The RS configuration 1023 may indicate which reference signals are to be reflected with each of the virtual focal points 1110, 1120, 1230, e.g., if the UE 500 is to determine the angular relationship between the IRS 620 and the UE 500. The RS configuration 1023 may indicate to the UE 500 that the UE 500 is to measure phases of the RS that will be transmitted, and to report the phases (e.g., if an entity other than the UE 500 will determine the angular relationship of the IRS 620 and the UE 500). The RS configuration 1023 may instruct the UE 500 to measure reference signals and report the channel for each of the reference signals, e.g., the phase for each of the reference signals and/or phase differences between pairs of the reference signals.

The TRP 300 transmits RS 1024 corresponding to, for example, one or more of SSB or CSI-RS, to the IRS 620. The RS 1024 may include identifiers of the reference signals. The IRS 620 reflects the RS 1024 with appropriate different reflection coefficient sets as RS 1026 with each set having reflection coefficients for the surface elements corresponding to a respective virtual focal point, in this example as three different reference signals each corresponding to a respective one of the first virtual focal point 1110 (VFP1), the second virtual focal point 1120 (VFP2), and the third virtual focal point 1230 (VFP3). The RS 1024 may have phase coherence, or there may be phase discontinuity between reference signals. If there is phase discontinuity between the reference signals, the discontinuity(ies) is(are) provided to the determining entity (i.e., the entity that determines the angular relationship between the IRS 620 and the UE 500) such that the phase difference between reference signals due to different travel lengths of the reference signals may be determined.

The RS 1026 may provide a watermarking function. A watermarking function helps the UE 500 differentiate between desired signals and undesired signals (e.g., multipath reflections). For example, a signal may be sent multiple times (e.g., multiple repetitions, multiple instances, etc.) with known phase differences between the multiple transmissions. A receiver of the signals may determine that the signals are desired signals if the phase of the signals varies in the known (e.g., agreed upon, systematic) way and identify any signal that does not have the expected phase as an undesired signal. The phase differences imparted by the IRS 620 for the RS 1026 may be used as a watermarking function to verify acceptability of the RS 1026.

At stage 1030, the UE 500 measure phases of the RS 1026. Referring also to FIG. 13, the RS measurement unit 550 measures the phase of each of the reference signal 1310 and the reference signal 1320 corresponding to the virtual focal points 1110, 1120, respectively. One or more further reference signals (e.g., a reference signal corresponding to the virtual focal point 1230) may be measured. The phase differences are in the range $[-\pi, \pi]$ and map to path length differences according to Equation (12).

Figure 14:
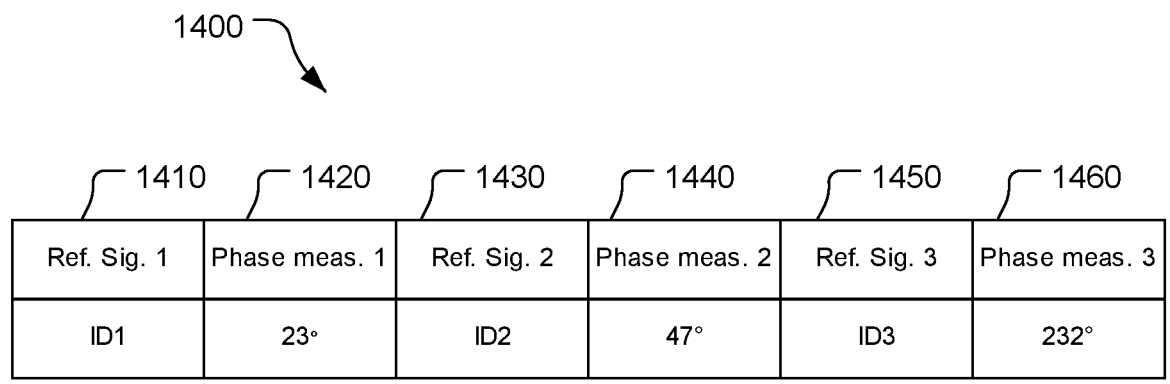
FIG. 14 is an example of a phase message providing phase measurement information.
Figure 15:
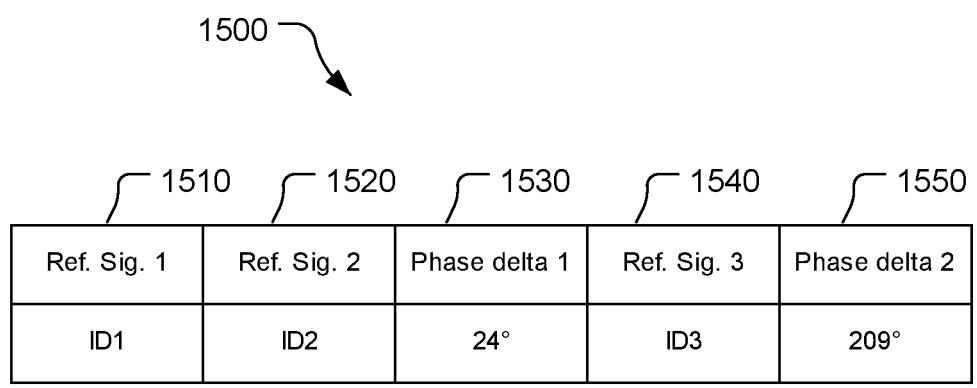
FIG. 15 is another example of a phase message providing phase measurement information.

At stage 1040, the UE 500 may transmit phase information 1042 to the server 400 (and/or other determining entity). The phase information 1042 includes the phase difference between phase measurements of the reference signals 1310, 1320 corresponding to the virtual focal points 1110, 1120 (and the phase difference(s) between one or more other pairs of reference signals corresponding to one or more other pairs of virtual focal points) and/or information from which the phase difference(s) may be determined (e.g., the phase measurements). The UE 500 may associate the phase information 1042 with the reference signals 1310, 1320, e.g., if the reference signals 1310, 1320 include identifiers. The association of the phase information 1042 of the reference signals 1310, 1320 with the reference signals 1310, 1320 may be determined based on the phase measurements indicating the identities of the reference signals 1310, 1320 or may be determined in one or more other ways, e.g., based on timing of transmission of the reference signals 1310, 1320 and timing of reporting of the phase measurements, and/or types of the reference signals 1310, 1320 and indicated signal types corresponding to the phase measurements, etc. For example, referring also to FIG. 14, the phase information 1042 may be provided in a phase message 1400 that includes a reference signal 1 ID field 1410, a phase measurement 1 field 1420, a reference signal 2 ID field 1430, a phase measurement 2 field 1440, a reference signal 3 ID field 1450, and a phase measurement 3 field 1460. The fields 1410, 1430, 1450 include indications of the reference signal identifiers, and the fields 1420, 1440, 1460 include indications of the measured phases of the respective reference signals. As another example, referring also to FIG. 15, the phase information 1042 may be provided in a phase message 1500 that includes a reference signal 1 ID field 1510, a reference signal 2 ID field 1520, a phase delta 1 field 1530, a reference signal 3 ID field 1540, and a phase delta 2 field 1550. The fields 1510, 1520, 1540 include indications of the reference signal identifiers, and the fields 1530, 1550 include indications of the phase difference between the reference signal identified in the field 1510 and the reference signal identified in the fields 1520, 1540, respectively. The messages 1400, 1500 are examples, and the phase information 1042 may be provided in other forms, e.g., the phase message 1400 but without the fields 1410, 1430, 1450 if the reference signals are implicit (e.g., by agreement, by timing of the reporting, etc.). Similarly, the fields 1510, 1520, 1540 may be omitted from the phase message 1500. Still other examples of messages providing the phase information 1042 may be used. For example, indications of the virtual focal points 1110, 1120, 1230 (e.g., the locations of the virtual focal points 1110, 1120, 1230) may be included in the phase information 1042 (e.g., in case the entity receiving the phase information 1042 does not have the virtual focal point locations). Stage 1040 may be omitted, e.g., if the UE 500 obtains the virtual focal point locations and will determine the angular relationship of the IRS 620 and the UE 500.

At stage 1050, the angle(s) between the IRS 620 and the UE 500 corresponding to the one or more pairs of reference signals measured is(are) determined. The angle(s) may be determined by the UE 500, the TRP 300, the server 400, the IRS 620 (if configured to do so, e.g., including a processor and memory), and/or any other entity configured to do so and that obtains information from which to do so. For example, the angle determination unit 560 determines the phase difference between the reference signal 1310 and the reference signal 1320. The angle determination unit 560 converts the phase difference to a distance difference using the frequency of the reference signals 1310, 1320. The angle determination unit 560 uses the distance difference and the locations of the first virtual focal point 1110 and the second virtual focal point 1120 to determine the reference angle 1340 of the UE 500 relative to the IRS 620 relative to the x-axis (in the x-z plane) per Equation (13). Provided with the phase information 1042 and knowledge of the locations of the virtual focal points 1110, 1120, any other entity (e.g., the server 400) may determine the angle of the UE 500 relative to the IRS 620, e.g., using Equations (12), (13). Further, the angle determination unit 560 (and/or another entity) may determine another reference angle (in a different plane from the reference angle 1340) using phase information for measurements of the reference signal 1310 and a reference signal for the third virtual focal point 1230. The reference angles based on the virtual focal points 1110, 1120 and 1110, 1230 may be combined to provide a three-dimensional angle from the IRS 620 to the UE 500. The angular relationship between the IRS 620 and the UE 500 is determined relative to a coordinate system of the IRS 620, which may be arranged such that the coordinate system of the IRS 620 corresponds with a global coordinate system, e.g., the surface 640 being orthogonal to the surface of the Earth. If the coordinate system of the IRS 620 is not aligned with a global coordinate system, then the angular relationship of the IRS 620 and the UE 500 may be converted into the global coordinate system.

The determining entity (i.e., the entity that determines the angular relationship of the IRS 620 and the UE 500) will obtain the locations of the virtual focal points used, and the phases of the respective reference signals measured by the UE 500, and will be told and/or be able to determine the phase differences between virtual focal points. In this example, the determining entity will be able to determine a phase difference between the reference signals 1310, 1320 reflected using the virtual focal points 1110, 1120, and a phase difference between the reference signal 1310 and a reference signal reflected using the third virtual focal point 1230. The determining entity (e.g., the server 400, or the TRP 300, or the IRS 620) may determine the locations of the virtual focal points. Also or alternatively, the determining entity may obtain the virtual focal points from one or more sources, e.g., any entity that determines or is provided with the virtual focal points. The determining entity may obtain the virtual focal points through wireless and/or wired communications. The determining entity may be provided with the phase differences, or phase measurements from which the phase differences may be calculated.

At stage 1060, a position estimate is determined for the UE 500. For example, the position estimate unit 570 may obtain a distance of the UE 500 from the IRS 620 using one or more known techniques (e.g., RTT, received signal power with a known signal transmit power, etc.). The position estimate unit 570 may combine the obtained (e.g., determined) distance with the determine angular relationship of the IRS 620 and the UE 500, and the location of the IRS 620 to determine the location of the UE 500. If a single angle relative to the IRS 620 is obtained, then the location of the UE 500 along a plane may be determined (or a circle in that plane if the distance from the IRS 620 to the UE 500 is known, or an arc if the beam used to determine the angle to the UE 500 is limited in that plane, i.e., does not emit 360° in that plane). As another example, the position estimate unit 570 of the UE 500, and/or another entity such as the server 400, may obtain multiple angular relationships between the UE 500 and multiple IRSes and use angles of rays from the IRSes to the UE 500 and the locations of the IRSes to determine the location of the UE 500 as an intersection of the rays. The determining entity may instruct the IRS 620 (or other transmitter capable of three-dimensional beam focusing) to focus a beam at the position estimate for the UE 500. For example, the TRP 300 may be able to transmit a beam that is focused in three dimensions, may determine the position estimate, and may instruct itself (e.g., the processor 310 may instruct the wireless transmitter 342) to transmit a beam focused at the position estimate.

The determined angle(s) of the UE 500 relative to the IRS 620 may be used for one or more purposes other than, or in addition to, determining a position estimate for the UE 500. For example, the determined angle(s) may be used for beam refinement, to help determine a beam to be used by the IRS 620 to send signals to and/or receive signals from the UE 500.

Figure 16:
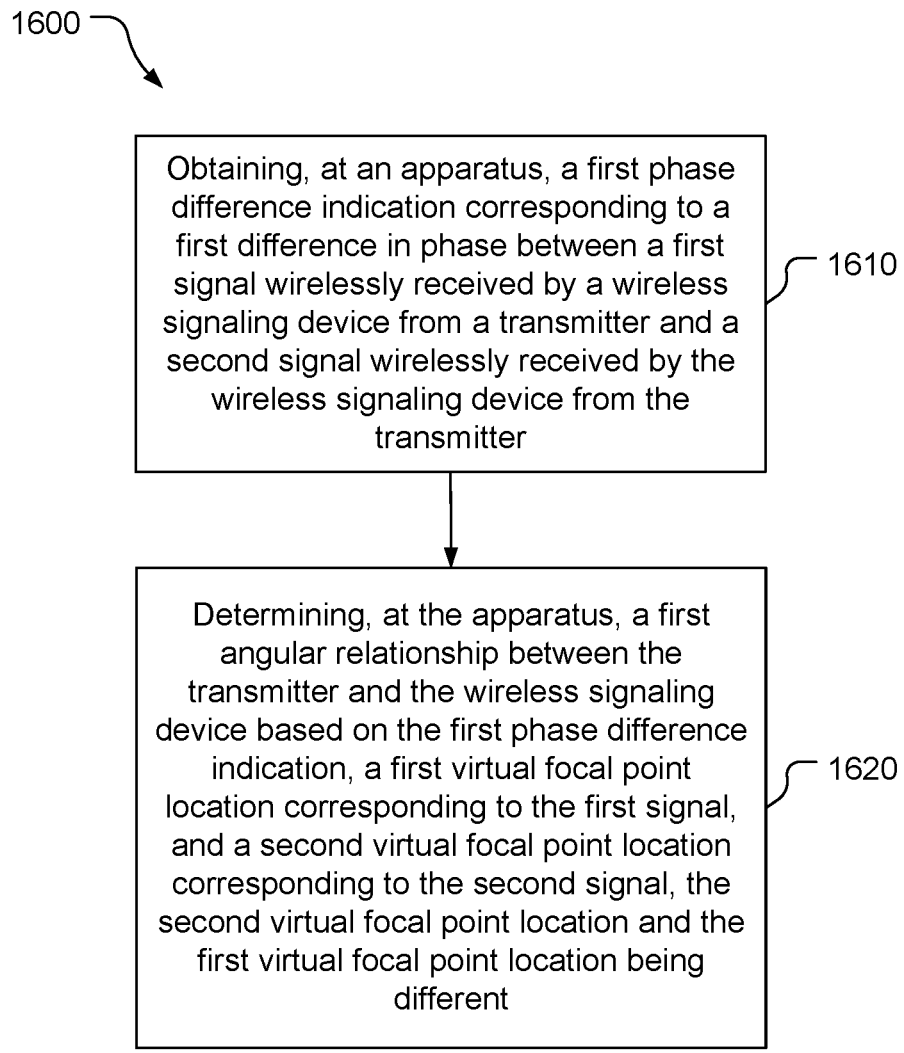
FIG. 16 is a block flow diagram of an angular relationship determination method.

Referring to FIG. 16, with further reference to FIGS. 1-15, an angular relationship determination method 1600 includes the stages shown. The method 1600 is, however, an example only and not limiting. The method 1600 may be altered, e.g., by having stages added, removed, rearranged, combined, performed concurrently, and/or having single stages split into multiple stages.

Figure 17:
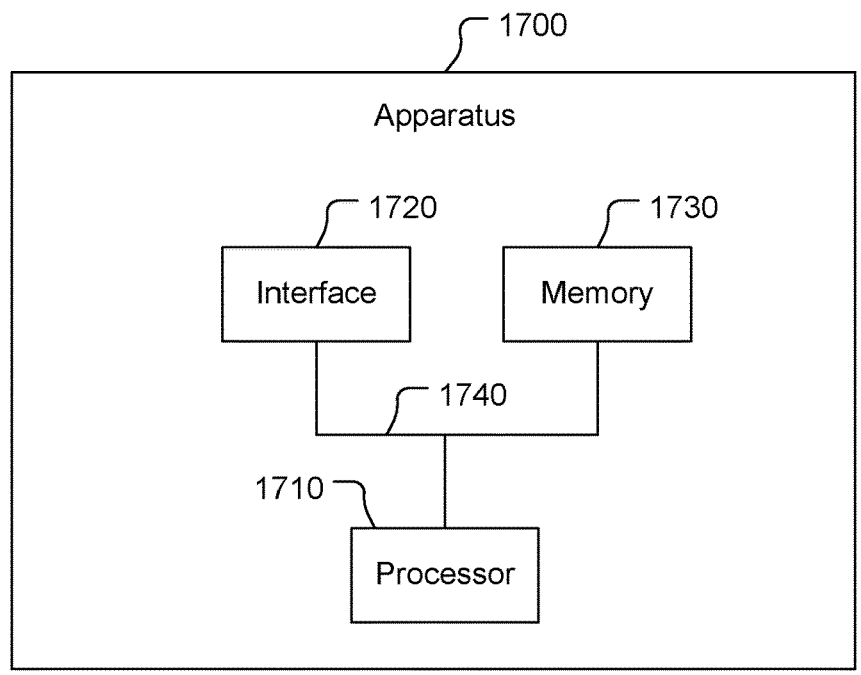
FIG. 17 is a simplified block diagram of an apparatus.
Figure 18:
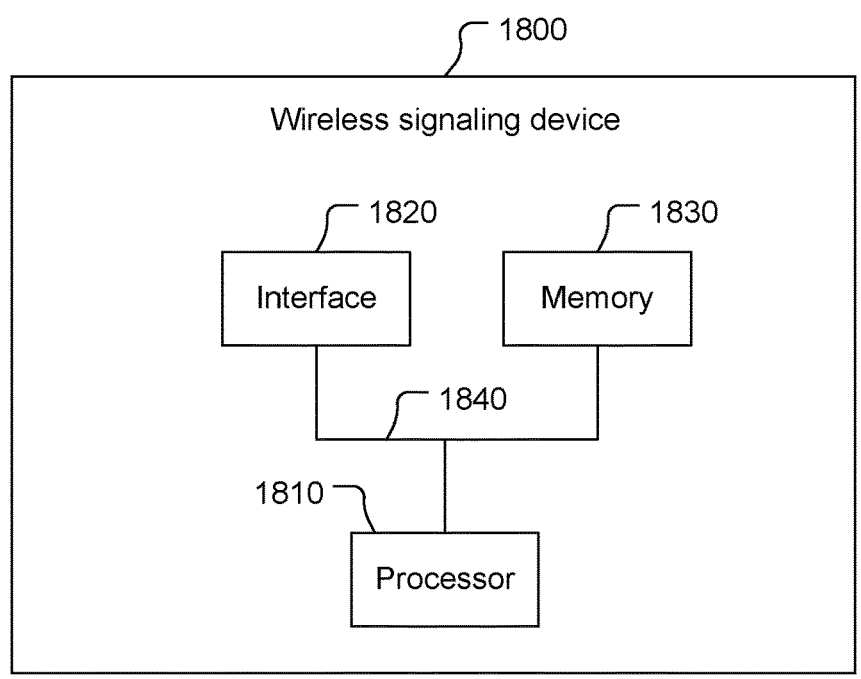
FIG. 18 is a simplified block diagram of a wireless signaling device.

At stage 1610, the method 1600 includes obtaining, at an apparatus, a first phase difference indication corresponding to a first difference in phase between a first signal wirelessly received by a wireless signaling device from a transmitter and a second signal wirelessly received by the wireless signaling device from the transmitter. For example, referring also to FIG. 17, an apparatus 1700 includes a processor 1710, an interface 1720, and memory 1730 communicatively coupled together by a bus 1740. The apparatus 1700 may, for example, be a server, a TRP, a UE, etc. Thus, for example, the TRP 300, the server 400, and/or the UE 500 may be an example of the apparatus 1700 and the processor 1710, the interface 1720, and the memory 1730 may be configured accordingly. Referring also to FIG. 18, a wireless signaling device 1800 includes a processor 1810, an interface 1820, and memory 1830 communicatively coupled together by a bus 1840. The wireless signaling device 1800 may, for example, be a UE or other device configured to receive wireless signals. Thus, for example, the UE 500 may be an example of the wireless signaling device 1800 and the processor 1810, the interface 1820, and the memory 1830 may, for example, be configured as discussed with respect to the processor 510, the interface 520, and the memory 530. The apparatus 1700, e.g., the server 400, may receive the phase information 1042 (containing information regarding one phase difference between reference signals, or possibly information regarding multiple phase differences between reference signals) from the wireless signaling device 1800, e.g., the UE 500 (e.g., via the IRS 620 and the TRP 300). As another example, the apparatus 1700, e.g., the TRP 300, may receive the phase information 1042 from the UE 500 (e.g., via the IRS 620). As another example, the apparatus 1700, e.g., the UE 500 may measure phases of reference signals and calculate the phase difference between the reference signals. The processor 410, possibly in combination with the memory 411, in combination with a portion of the transceiver 415 (e.g., the wired receiver 454 and/or the wireless receiver 444 and the antenna 446) may comprise means for obtaining the first phase difference. The processor 310, possibly in combination with the memory 311, in combination with a portion of the transceiver 315 (e.g., the wireless receiver 344 and the antenna 346) may comprise means for obtaining the first phase difference. The processor 510, possibly in combination with the memory 530, in combination with a portion of the interface 520 (e.g., the wireless receiver 244 and the antenna 246) may comprise means for obtaining the first phase difference.

At stage 1620, the method 1600 includes determining, at the apparatus, a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different. For example, the apparatus 1700 (e.g., the server 400 (e.g., an LMF), the TRP 300, and/or the UE 500) may use the phase difference between the reference signals 1310, 1320 and the locations of the virtual focal points 1110, 1120 to determine the reference angle 1340 from the IRS 620 to the wireless signaling device 1800, e.g., the UE 500, as discussed above with respect to stage 1050. As another example, the apparatus 1700 may use the phase difference between the reference signal 1310 with the first virtual focal point and a reference signal for the third virtual focal point 1230 to determine another reference angle from the IRS 620 to the UE 500. In this way, the angle from a transmitter, e.g., the IRS 620 (or the TRP 300), to a wireless signaling device, e.g., the UE 500, may be determined quickly and used for any of a variety of applications (e.g., determining a position estimate for the UE 500, beam refinement, etc.). The processor 410, possibly in combination with the memory 411, may comprise means for determining the first angular relationship. The processor 310, possibly in combination with the memory 311, may comprise means for determining the first angular relationship. The processor 510, possibly in combination with the memory 530, may comprise means for determining the first angular relationship.

Implementations of the method 1600 may include one or more of the following features. In an example implementation, the method 1600 includes: obtaining, at the apparatus, a second phase difference indication corresponding to a second difference in phase between a third signal wirelessly received by the wireless signaling device from the transmitter and a fourth signal wirelessly received by the wireless signaling device from the transmitter; and determining, at the apparatus, a second angular relationship between the transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different; where a first direction of a first vector from the first virtual focal point location is different from a second direction from the third virtual focal point location to the fourth virtual focal point location. For example, the apparatus 1700 may repeat stages 1610, 1620 but for a different combination of reference signals, e.g., the reference signal 1310 and a reference signal corresponding to the third virtual focal point 1230, or reference signals corresponding to the third virtual focal point 1230 and to a fourth virtual focal point 1231, to determine another reference angle from the IRS 620 to the UE 500. The processor 410, possibly in combination with the memory 411, in combination with a portion of the transceiver 415 (e.g., the wired receiver 454 and/or the wireless receiver 444 and the antenna 446) may comprise means for obtaining the second phase difference. The processor 310, possibly in combination with the memory 311, in combination with a portion of the transceiver 315 (e.g., the wireless receiver 344 and the antenna 346) may comprise means for obtaining the second phase difference. The processor 510, possibly in combination with the memory 530, in combination with a portion of the interface 520 (e.g., the wireless receiver 244 and the antenna 246) may comprise means for obtaining the second phase difference. The processor 410, possibly in combination with the memory 411, may comprise means for determining the second angular relationship. The processor 310, possibly in combination with the memory 311, may comprise means for determining the second angular relationship. The processor 510, possibly in combination with the memory 530, may comprise means for determining the second angular relationship. In another example implementation, the third virtual focal point location is either the first virtual focal point location or the second virtual focal point location. For example, using the virtual focal points 1110, 1120, 1230 may be used instead of using the virtual focal points 1110, 1120, and another virtual focal point (e.g., the fourth virtual focal point 1231).

Also or alternatively, implementations of the method 1600 may include one or more of the following features. In an example implementation, the method 1600 includes determining, at the apparatus, a position estimate of the wireless signaling device based on the first angular relationship, a location of the transmitter, and a distance between the transmitter and the wireless signaling device. For example, the apparatus 1700 determines a position estimate for the UE 500, e.g., at stage 1060 as discussed above, using the reference angle 1340, the location of the IRS 620, and a distance from the IRS 620 to the UE 500. The processor 410, possibly in combination with the memory 411, may comprise means for determining the position estimate. The processor 310, possibly in combination with the memory 311, may comprise means for determining the position estimate. The processor 510, possibly in combination with the memory 530, may comprise means for determining the position estimate. In a further example implementation, the method 1600 includes instructing the transmitter to focus a beam at the position estimate of the wireless signaling device. For example, the apparatus 1700 may send a message to the IRS 620 (or the TRP 300 or other transmitter capable of three-dimensional beam focusing) instructing the IRS 620 (or other transmitter) to focus a beam in three dimensions at the position estimate. If the determining entity is the transmitter, then this instructing may comprise the determining entity/transmitter instructing the determining entity/transmitter to focus a beam at the position estimate. The processor 410, possibly in combination with the memory 411, in combination with a portion of the transceiver 415 (e.g., the wired transmitter 452 and/or the wireless transmitter 442 and the antenna 446) may comprise means for instructing the transmitter. The processor 310, possibly in combination with the memory 311, in combination with a portion of the transceiver 315 (e.g., the wireless transmitter 342 and the antenna 346) may comprise means for instructing the transmitter. The processor 310, possibly in combination with the memory 311, may comprise means for instructing the transmitter. The processor 510, possibly in combination with the memory 530, in combination with a portion of the interface 520 (e.g., the wireless transmitter 242 and the antenna 246) may comprise means for instructing the transmitter.

Also or alternatively, implementations of the method 1600 may include one or more of the following features. In an example implementation, the transmitter is a first transmitter, and the method 1600 includes: obtaining, at the apparatus, a second phase difference indication corresponding to a second difference in phase between a third signal wirelessly received by the wireless signaling device from a second transmitter and a fourth signal wirelessly received by the wireless signaling device from the second transmitter; determining, at the apparatus, a second angular relationship between the second transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different; obtaining, at the apparatus, a third phase difference indication corresponding to a third difference in phase between a fifth signal wirelessly received by the wireless signaling device from a third transmitter and a sixth signal wirelessly received by the wireless signaling device from the third transmitter; determining, at the apparatus, a third angular relationship between the third transmitter and the wireless signaling device based on the third phase difference indication, a fifth virtual focal point location corresponding to the fifth signal, and a sixth virtual focal point location corresponding to the sixth signal, the sixth virtual focal point location and the fifth virtual focal point location being different; and determining, at the apparatus, a position estimate of the wireless signaling device based on the first angular relationship, the second angular relationship, the third angular relationship, a location of the first transmitter, a location of the second transmitter, and a location the third transmitter. For example, the apparatus 1700 may obtain phase differences of reference signals (e.g., the reference signals 1310, 1320 and other reference signals with offsets in the same plane, e.g., the x-z plane) measured by the wireless signaling device 1800, e.g., the UE 500, from three different transmitters, determine the angles from those transmitters to the UE 500, and determine a position estimate for the UE 500 as the intersection of those angles from the locations of the transmitters. Angles from more than three transmitters may be determined and used to determine the position estimate of the UE 500.

Also or alternatively, implementations of the method 1600 may include one or more of the following features. In an example implementation, the method 1600 includes instructing the transmitter to transmit the first signal with the first virtual focal point location and the second signal with the second virtual focal point location. For example, the apparatus 1700, e.g., the server 400 or the TRP 300, instructs the TRP 300 or the IRS 620 to transmit references signals with identified virtual focal point locations (e.g., relative to the transmitter). The processor 410, possibly in combination with the memory 411, in combination with a portion of the transceiver 415 (e.g., the wired transmitter 452 and/or the wireless transmitter 442 and the antenna 446) may comprise means for instructing the transmitter. The processor 310, possibly in combination with the memory 311, in combination with a portion of the transceiver 315 (e.g., the wireless transmitter 342 and the antenna 346) may comprise means for instructing the transmitter. In a further example implementation, the transmitter is an intelligent reflecting surface and the method 1600 further comprises transmitting, from the apparatus via a communication interface, a message to the transmitter instructing the transmitter to transmit the first signal and the second signal. For example, the IRS 620 is instructed to reflect a signal received from another entity such as a gNB. In an alternative further example implementation, instructing the transmitter to transmit the first signal with the first virtual focal point location and the second signal with the second virtual focal point location comprises instructing the transmitter to transmit the first signal and the second signal such that a distance between the first virtual focal point location and the second virtual focal point location is no more than half a wavelength at a frequency of the first signal and the second signal. For example, the apparatus 1700, e.g., the server 400 or the TRP 300, may determine the first and second virtual focal points to be within a half of a wavelength of a frequency of the first and second signals and instruct the transmitter to transmit the first and second signals with the first and second virtual focal points.

Also or alternatively, implementations of the method 1600 may include one or more of the following features. In an example implementation, transmitting, from the apparatus via a communication interface, a message instructing the wireless signaling device to provide the first phase difference indication, or instructing the wireless signaling device to provide a first measured phase of the first signal and a second measured phase of the second signal, or instructing the wireless signaling device to provide a combination thereof. For example, the apparatus 1700 (e.g., the server 400 or the TRP 300) may instruct the UE 500 (e.g., via the RS configuration 1023 or other message) to provide phase information regarding reference signals, e.g., measured phases and/or difference of measured phases. The processor 410, possibly in combination with the memory 411, in combination with a portion of the transceiver 415 (e.g., the wired transmitter 452 and/or the wireless transmitter 442 and the antenna 446) may comprise means for transmitting the message instructing the wireless signaling device to provide phase information. The processor 310, possibly in combination with the memory 311, in combination with a portion of the transceiver 315 (e.g., the wireless transmitter 342 and the antenna 346) may comprise means for transmitting the message instructing the wireless signaling device to provide phase information. In another example implementation, the apparatus is the wireless signaling device, and the method 1600 includes, at the wireless signaling device: measuring a first phase of the first signal; measuring a second phase of the second signal; determining the first difference in phase between the first signal and the second signal; and receiving, via a communication interface of the wireless signaling device, a first indication of the first virtual focal point location and a second indication of the second virtual focal point location. For example, the UE 500 (e.g., the RS measurement unit 550 and possibly the angle determination unit 560) measures phases of the reference signals 1310, 1320, determines a phase difference between the reference signals 1310, 1320, and receives, via the interface 520, indications of locations of the virtual focal points 1110, 1120, e.g., for use in determining an angle from the transmitter (e.g., the IRS 620) to the UE 500, and possibly determining a position estimate for the UE 500. The processor 510, possibly in combination with the memory 530, in combination with a portion of the interface 520 (e.g., the wireless receiver 244 and the antenna 246) may comprise means for measuring the first phase of the first signal, means for measuring the second phase of the second signal, and means for receiving indications of virtual focal point locations. The processor 510, possibly in combination with the memory 530, may comprise means for determining the first phase difference.

Implementation Examples

Implementation examples are provided in the following numbered clauses.

Clause 1. An apparatus comprising:
 a communication interface;
 a memory; and
 a processor communicatively coupled to the communication interface and the memory and configured to:
  obtain a first phase difference indication corresponding to a first difference in phase between a first signal wirelessly received by a wireless signaling device from a transmitter and a second signal wirelessly received by the wireless signaling device from the transmitter; and
  determine a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

Clause 2. The apparatus of clause 1, wherein the processor is configured to:
 obtain a second phase difference indication corresponding to a second difference in phase between a third signal wirelessly received by the wireless signaling device from the transmitter and a fourth signal wirelessly received by the wireless signaling device from the transmitter; and
 determine a second angular relationship between the transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;
 wherein a first direction of a first vector from the first virtual focal point location to the second virtual focal point location is different from a second direction from the third virtual focal point location to the fourth virtual focal point location.

Clause 3. The apparatus of clause 2, wherein the processor is configured to determine a position estimate of the wireless signaling device based on the first angular relationship, the second angular relationship, a location of the transmitter, and a distance between the transmitter and the wireless signaling device.

Clause 4. The apparatus of clause 3, wherein the processor is configured to instruct the transmitter to focus a beam at the position estimate of the wireless signaling device.

Clause 5. The apparatus of clause 1, wherein the transmitter is a first transmitter, and the processor is configured to:

obtain a second phase difference indication corresponding to a second difference in phase between a third signal wirelessly received by the wireless signaling device from a second transmitter and a fourth signal wirelessly received by the wireless signaling device from the second transmitter;

determine a second angular relationship between the second transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

obtain a third phase difference indication corresponding to a third difference in phase between a fifth signal wirelessly received by the wireless signaling device from a third transmitter and a sixth signal wirelessly received by the wireless signaling device from the third transmitter;

determine a third angular relationship between the third transmitter and the wireless signaling device based on the third phase difference indication, a fifth virtual focal point location corresponding to the fifth signal, and a sixth virtual focal point location corresponding to the sixth signal, the sixth virtual focal point location and the fifth virtual focal point location being different; and determine a position estimate of the wireless signaling device based on the first angular relationship, the second angular relationship, the third angular relationship, a location of the first transmitter, a location of the second transmitter, and a location the third transmitter.

Clause 6. The apparatus of clause 1, wherein the processor is configured to instruct the transmitter to transmit the first signal with the first virtual focal point location and the second signal with the second virtual focal point location.

Clause 7. The apparatus of clause 6, wherein the transmitter is an intelligent reflecting surface and the processor is configured to transmit, via the communication interface, a message to the transmitter instructing the transmitter to transmit the first signal and the second signal.

Clause 8. The apparatus of clause 6, wherein the processor is configured to instruct the transmitter to transmit the first signal and the second signal such that a distance between the first virtual focal point location and the second virtual focal point location is no more than half a wavelength at a frequency of the first signal and the second signal.

Clause 9. The apparatus of clause 1, wherein the processor is configured to transmit a message instruction via the communication interface instructing the wireless signaling device to provide the first phase difference indication, or instructing the wireless signaling device to provide a first measured phase of the second signal and a second measured phase of the second signal, or instructing the wireless signaling device to provide a combination thereof.

Clause 10. The apparatus of clause 1, wherein the apparatus is the wireless signaling device, and the processor is configured to:

measure a first phase of the first signal;

measure a second phase of the second signal;

determine the first difference in phase between the first signal and the second signal; and receive, via the communication interface, a first indication of the first virtual focal point location and a second indication of the second virtual focal point location.

Clause 11. An angular relationship determination method comprising:

obtaining, at an apparatus, a first phase difference indication corresponding to a first difference in phase between a first signal wirelessly received by a wireless signaling device from a transmitter and a second signal wirelessly received by the wireless signaling device from the transmitter; and determining, at the apparatus, a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

Clause 12. The angular relationship determination method of clause 11, further comprising:

obtaining, at the apparatus, a second phase difference indication corresponding to a second difference in phase between a third signal wirelessly received by the wireless signaling device from the transmitter and a fourth signal wirelessly received by the wireless signaling device from the transmitter; and determining, at the apparatus, a second angular relationship between the transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

wherein a first direction of a first vector from the first virtual focal point location to the second virtual focal point location is different from a second direction from the third virtual focal point location to the fourth virtual focal point location.

Clause 13. The angular relationship determination method of clause 12, wherein the third virtual focal point location is either the first virtual focal point location or the second virtual focal point location.

Clause 14. The angular relationship determination method of clause 12, further comprising determining, at the apparatus, a position estimate of the wireless signaling device based on the first angular relationship, the second angular relationship, a location of the transmitter, and a distance between the transmitter and the wireless signaling device.

Clause 15. The angular relationship determination method of clause 14, further comprising instructing the transmitter to focus a beam at the position estimate of the wireless signaling device.

Clause 16. The angular relationship determination method of clause 11, wherein the transmitter is a first transmitter, and the angular relationship determination method further comprises:

obtaining, at the apparatus, a second phase difference indication corresponding to a second difference in phase between a third signal wirelessly received by the wireless signaling device from a second transmitter and a fourth signal wirelessly received by the wireless signaling device from the second transmitter;

determining, at the apparatus, a second angular relationship between the second transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

obtaining, at the apparatus, a third phase difference indication corresponding to a third difference in phase between a fifth signal wirelessly received by the wireless signaling device from a third transmitter and a sixth signal wirelessly received by the wireless signaling device from the third transmitter;

determining, at the apparatus, a third angular relationship between the third transmitter and the wireless signaling device based on the third phase difference indication, a fifth virtual focal point location corresponding to the fifth signal, and a sixth virtual focal point location corresponding to the sixth signal, the sixth virtual focal point location and the fifth virtual focal point location being different; and determining, at the apparatus, a position estimate of the wireless signaling device based on the first angular relationship, the second angular relationship, the third angular relationship, a location of the first transmitter, a location of the second transmitter, and a location the third transmitter.

Clause 17. The angular relationship determination method of clause 11, further comprising instructing the transmitter to transmit the first signal with the first virtual focal point location and the second signal with the second virtual focal point location.

Clause 18. The angular relationship determination method of clause 17, wherein the transmitter is an intelligent reflecting surface and the angular relationship determination method further comprises transmitting, from the apparatus via a communication interface, a message to the transmitter instructing the transmitter to transmit the first signal and the second signal.

Clause 19. The angular relationship determination method of clause 17, wherein instructing the transmitter to transmit the first signal with the first virtual focal point location and the second signal with the second virtual focal point location comprises instructing the transmitter to transmit the first signal and the second signal such that a distance between the first virtual focal point location and the second virtual focal point location is no more than half a wavelength at a frequency of the first signal and the second signal.

Clause 20. The angular relationship determination method of clause 11, further comprising transmitting, from the apparatus via a communication interface, a message instructing the wireless signaling device to provide the first phase difference indication, or instructing the wireless signaling device to provide a first measured phase of the first signal and a second measured phase of the second signal, or instructing the wireless signaling device to provide a combination thereof.

Clause 21. The angular relationship determination method of clause 11, wherein the apparatus is the wireless signaling device, and the angular relationship determination method further comprises, at the wireless signaling device:

measuring a first phase of the first signal;

measuring a second phase of the second signal;

determining the first difference in phase between the first signal and the second signal; and receiving, via a communication interface of the wireless signaling device, a first indication of the first virtual focal point location and a second indication of the second virtual focal point location.

Clause 22. An apparatus comprising:

means for obtaining a first phase difference indication corresponding to a first difference in phase between a first signal wirelessly received by a wireless signaling device from a transmitter and a second signal wirelessly received by the wireless signaling device from the transmitter; and means for determining a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

Clause 23. The apparatus of clause 22, further comprising:

means for obtaining a second phase difference indication corresponding to a second difference in phase between a third signal wirelessly received by the wireless signaling device from the transmitter and a fourth signal wirelessly received by the wireless signaling device from the transmitter; and means for determining a second angular relationship between the transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

wherein a first direction of a first vector from the first virtual focal point location to the second virtual focal point location is different from a second direction from the third virtual focal point location to the fourth virtual focal point location.

Clause 24. The apparatus of clause 23, wherein the third virtual focal point location is either the first virtual focal point location or the second virtual focal point location.

Clause 25. The apparatus of clause 23, further comprising means for determining a position estimate of the wireless signaling device based on the first angular relationship, the second angular relationship, a location of the transmitter, and a distance between the transmitter and the wireless signaling device.

Clause 26. The apparatus of clause 25, further comprising means for instructing the transmitter to focus a beam at the position estimate of the wireless signaling device.

Clause 27. The apparatus of clause 22, wherein the transmitter is a first transmitter, and the apparatus further comprises:

means for obtaining a second phase difference indication corresponding to a second difference in phase between a third signal wirelessly received by the wireless signaling device from a second transmitter and a fourth signal wirelessly received by the wireless signaling device from the second transmitter;

means for determining a second angular relationship between the second transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

means for obtaining a third phase difference indication corresponding to a third difference in phase between a fifth signal wirelessly received by the wireless signaling device from a third transmitter and a sixth signal wirelessly received by the wireless signaling device from the third transmitter;

means for determining a third angular relationship between the third transmitter and the wireless signaling device based on the third phase difference indication, a fifth virtual focal point location corresponding to the fifth signal, and a sixth virtual focal point location corresponding to the sixth signal, the sixth virtual focal point location and the fifth virtual focal point location being different; and means for determining a position estimate of the wireless signaling device based on the first angular relationship, the second angular relationship, the third angular relationship, a location of the first transmitter, a location of the second transmitter, and a location the third transmitter.

Clause 28. The apparatus of clause 22, further comprising means for instructing the transmitter to transmit the first signal with the first virtual focal point location and the second signal with the second virtual focal point location.

Clause 29. The apparatus of clause 28, wherein the transmitter is an intelligent reflecting surface and the apparatus further comprises means for transmitting a message to the transmitter instructing the transmitter to transmit the first signal and the second signal.

Clause The apparatus of clause 28, wherein the means for instructing the transmitter to transmit the first signal with the first virtual focal point location and the second signal with the second virtual focal point location comprises means for instructing the transmitter to transmit the first signal and the second signal such that a distance between the first virtual focal point location and the second virtual focal point location is no more than half a wavelength at a frequency of the first signal and the second signal.

Clause 31. The apparatus of clause 22, further comprising means for transmitting a message instructing the wireless signaling device to provide the first phase difference indication, or instructing the wireless signaling device to provide a first measured phase of the first signal and a second measured phase of the second signal, or instructing the wireless signaling device to provide a combination thereof.

Clause 32. The apparatus of clause 22, wherein the apparatus is the wireless signaling device, and the apparatus further comprises:

means for measuring a first phase of the first signal;

means for measuring a second phase of the second signal;

means for determining the first difference in phase between the first signal and the second signal; and means for receiving a first indication of the first virtual focal point location and a second indication of the second virtual focal point location.

Clause 33. A non-transitory, processor-readable storage medium comprising processor-readable instructions to cause a processor, of an apparatus, to:

obtain a first phase difference indication corresponding to a first difference in phase between a first signal wirelessly received by a wireless signaling device from a transmitter and a second signal wirelessly received by the wireless signaling device from the transmitter; and determine a first angular relationship between the transmitter and the wireless signaling device based on the first phase difference indication, a first virtual focal point location corresponding to the first signal, and a second virtual focal point location corresponding to the second signal, the second virtual focal point location and the first virtual focal point location being different.

Clause 34. The storage medium of clause 33, further comprising processor-readable instructions to cause the processor to:

obtain a second phase difference indication corresponding to a second difference in phase between a third signal wirelessly received by the wireless signaling device from the transmitter and a fourth signal wirelessly received by the wireless signaling device from the transmitter; and determine a second angular relationship between the transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

wherein a first direction of a first vector from the first virtual focal point location to the second virtual focal point location is different from a second direction from the third virtual focal point location to the fourth virtual focal point location.

Clause 35. The storage medium of clause 34, wherein the third virtual focal point location is either the first virtual focal point location or the second virtual focal point location.

Clause 36. The storage medium of clause 34, further comprising processor-readable instructions to cause the processor to determine a position estimate of the wireless signaling device based on the first angular relationship, the second angular relationship, a location of the transmitter, and a distance between the transmitter and the wireless signaling device.

Clause 37. The storage medium of clause 36, further comprising processor-readable instructions to cause the processor to instruct the transmitter to focus a beam at the position estimate of the wireless signaling device.

Clause 38. The storage medium of clause 33, wherein the transmitter is a first transmitter, and the storage medium further comprises processor-readable instructions to cause the processor to:

obtain a second phase difference indication corresponding to a second difference in phase between a third signal wirelessly received by the wireless signaling device from a second transmitter and a fourth signal wirelessly received by the wireless signaling device from the second transmitter;

determine a second angular relationship between the second transmitter and the wireless signaling device based on the second phase difference indication, a third virtual focal point location corresponding to the third signal, and a fourth virtual focal point location corresponding to the fourth signal, the fourth virtual focal point location and the third virtual focal point location being different;

obtain a third phase difference indication corresponding to a third difference in phase between a fifth signal wirelessly received by the wireless signaling device from a third transmitter and a sixth signal wirelessly received by the wireless signaling device from the third transmitter;

determine a third angular relationship between the third transmitter and the wireless signaling device based on the third phase difference indication, a fifth virtual focal point location corresponding to the fifth signal, and a sixth virtual focal point location corresponding to the sixth signal, the sixth virtual focal point location and the fifth virtual focal point location being different; and determine a position estimate of the wireless signaling device based on the first angular relationship, the second angular relationship, the third angular relationship, a location of the first transmitter, a location of the second transmitter, and a location the third transmitter.

Clause 39. The storage medium of clause 33, further comprising processor-readable instructions to cause the processor to instruct the transmitter to transmit the first signal with the first virtual focal point location and the second signal with the second virtual focal point location.

Clause 40. The storage medium of clause 39, wherein the transmitter is an intelligent reflecting surface and the storage medium further comprises processor-readable instructions to cause the processor to transmit a message to the transmitter instructing the transmitter to transmit the first signal and the second signal.

Clause 41. The storage medium of clause 39, wherein the processor-readable instructions to cause the processor to instruct the transmitter to transmit the first signal with the first virtual focal point location and the second signal with the second virtual focal point location comprise processor-readable instructions to cause the processor to instruct the transmitter to transmit the first signal and the second signal such that a distance between the first virtual focal point location and the second virtual focal point location is no more than half a wavelength at a frequency of the first signal and the second signal.

Clause 42. The storage medium of clause 33, further comprising processor-readable instructions to cause the processor to transmit a message instructing the wireless signaling device to provide the first phase difference indication, or instructing the wireless signaling device to provide a first measured phase of the first signal and a second measured phase of the second signal, or instructing the wireless signaling device to provide a combination thereof.

Clause 43. The storage medium of clause 33, wherein the apparatus is the wireless signaling device, and the storage medium further comprises processor-readable instructions to cause the processor to:

measure a first phase of the first signal;

measure a second phase of the second signal;

determine the first difference in phase between the first signal and the second signal; and receive a first indication of the first virtual focal point location and a second indication of the second virtual focal point location.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
   a communication interface;
   a memory; and
   a processor communicatively coupled to the communication interface and the memory and configured to:
      obtain a first phase difference indication corresponding to a first difference in phase between a first signal wirelessly received, at a first time, by a wireless signaling device from a transmitter and a second signal wirelessly received, at a second time that is different from the first time, by the wireless signaling device from the transmitter; and
      determine a first angular relationship between the transmitter and the wireless signaling device based on the first phase difference indication, a first virtual focal point location of the first signal, and a second virtual focal point location of the second signal, the second virtual focal point location and the first virtual focal point location being different, wherein a virtual focal point location is a location from which a signal appears to originate based on a phase surface of the signal, and wherein the first angular relationship is a first angle from a first line, connecting the first virtual focal point location and the second virtual focal point location, to the wireless signaling device.

2. The apparatus of claim 1, wherein the processor is configured to:
   obtain a second phase difference indication corresponding to a second difference in phase between a third signal wirelessly received, at a third time, by the wireless signaling device from the transmitter and a fourth signal wirelessly received, at a fourth time that is different from the third time, by the wireless signaling device from the transmitter; and
   determine a second angular relationship between the transmitter and the wireless signaling device based on the second phase difference indication, a third virtual focal point location of the third signal, and a fourth virtual focal point location of the fourth signal, the fourth virtual focal point location and the third virtual focal point location being different, wherein the second angular relationship is a second angle from a second line, connecting the third virtual focal point location and the fourth virtual focal point location, to the wireless signaling device;
   wherein a first direction of a first vector from the first virtual focal point location to the second virtual focal point location is different from a second direction from the third virtual focal point location to the fourth virtual focal point location.

3. The apparatus of claim 2, wherein the processor is configured to determine a position estimate of the wireless signaling device based on the first angular relationship, the second angular relationship, a location of the transmitter, and a distance between the transmitter and the wireless signaling device.

4. The apparatus of claim 3, wherein the processor is configured to instruct the transmitter to focus a beam at the position estimate of the wireless signaling device.

5. The apparatus of claim 1, wherein the transmitter is a first transmitter, and the processor is configured to:
  obtain a second phase difference indication corresponding to a second difference in phase between a third signal wirelessly received, at a third time, by the wireless signaling device from a second transmitter and a fourth signal wirelessly received, at a fourth time that is different from the third time, by the wireless signaling device from the second transmitter;
  determine a second angular relationship between the second transmitter and the wireless signaling device based on the second phase difference indication, a third virtual focal point location of the third signal, and a fourth virtual focal point location of the fourth signal, the fourth virtual focal point location and the third virtual focal point location being different, wherein the second angular relationship is a second angle from a second line, connecting the third virtual focal point location and the fourth virtual focal point location, to the wireless signaling device;
  obtain a third phase difference indication corresponding to a third difference in phase between a fifth signal wirelessly received, at a fifth time, by the wireless signaling device from a third transmitter and a sixth signal wirelessly received, at a sixth time that is different from the fifth time, by the wireless signaling device from the third transmitter;
  determine a third angular relationship between the third transmitter and the wireless signaling device based on the third phase difference indication, a fifth virtual focal point location of the fifth signal, and a sixth virtual focal point location of the sixth signal, the sixth virtual focal point location and the fifth virtual focal point location being different, wherein the third angular relationship is a third angle from a third line, connecting the fifth virtual focal point location and the sixth virtual focal point location, to the wireless signaling device; and
  determine a position estimate of the wireless signaling device based on the first angular relationship, the second angular relationship, the third angular relationship, a location of the first transmitter, a location of the second transmitter, and a location the third transmitter.

6. The apparatus of claim 1, wherein the processor is configured to instruct the transmitter to transmit the first signal with the first virtual focal point location and the second signal with the second virtual focal point location.

7. The apparatus of claim 6, wherein the transmitter is an intelligent reflecting surface and the processor is configured to transmit, via the communication interface, a message to the transmitter instructing the transmitter to transmit the first signal and the second signal.

8. The apparatus of claim 6, wherein the processor is configured to instruct the transmitter to transmit the first signal and the second signal such that a distance between the first virtual focal point location and the second virtual focal point location is no more than half a wavelength at a frequency of the first signal and the second signal.

9. The apparatus of claim 1, wherein the processor is configured to transmit a message instruction via the communication interface instructing the wireless signaling device to provide the first phase difference indication, or instructing the wireless signaling device to provide a first measured phase of the first signal and a second measured phase of the second signal, or instructing the wireless signaling device to provide a combination thereof.

10. An angular relationship determination method comprising:
  obtaining, at an apparatus, a first phase difference indication corresponding to a first difference in phase between a first signal wirelessly received, at a first time, by a wireless signaling device from a transmitter and a second signal wirelessly received, at a second time that is different from the first time, by the wireless signaling device from the transmitter; and
  determining, at the apparatus, a first angular relationship between the transmitter and the wireless signaling device based on the first phase difference indication, a first virtual focal point location of the first signal, and a second virtual focal point location of the second signal, the second virtual focal point location and the first virtual focal point location being different, wherein a virtual focal point location is a location from which a signal appears to originate based on a phase surface of the signal, and wherein the first angular relationship is a first angle from a first line, connecting the first virtual focal point location and the second virtual focal point location, to the wireless signaling device.

11. The angular relationship determination method of claim 10, further comprising:
  obtaining, at the apparatus, a second phase difference indication corresponding to a second difference in phase between a third signal wirelessly received, at a third time, by the wireless signaling device from the transmitter and a fourth signal wirelessly received, at a fourth time that is different from the third time, by the wireless signaling device from the transmitter; and
  determining, at the apparatus, a second angular relationship between the transmitter and the wireless signaling device based on the second phase difference indication, a third virtual focal point location of the third signal, and a fourth virtual focal point location of the fourth signal, the fourth virtual focal point location and the third virtual focal point location being different, wherein the second angular relationship is a second angle from a second line, connecting the third virtual focal point location and the fourth virtual focal point location, to the wireless signaling device;
  wherein a first direction of a first vector from the first virtual focal point location to the second virtual focal point location is different from a second direction from the third virtual focal point location to the fourth virtual focal point location.

12. The angular relationship determination method of claim 11, wherein the third virtual focal point location is either the first virtual focal point location or the second virtual focal point location.

13. The angular relationship determination method of claim 11, further comprising determining, at the apparatus, a position estimate of the wireless signaling device based on the first angular relationship, the second angular relationship, a location of the transmitter, and a distance between the transmitter and the wireless signaling device.

14. The angular relationship determination method of claim 13, further comprising instructing the transmitter to focus a beam at the position estimate of the wireless signaling device.

15. The angular relationship determination method of claim 10, wherein the transmitter is a first transmitter, and the angular relationship determination method further comprises:
obtaining, at the apparatus, a second phase difference indication corresponding to a second difference in phase between a third signal wirelessly received, at a third time, by the wireless signaling device from a second transmitter and a fourth signal wirelessly received, at a fourth time that is different from the third time, by the wireless signaling device from the second transmitter;
determining, at the apparatus, a second angular relationship between the second transmitter and the wireless signaling device based on the second phase difference indication, a third virtual focal point location of the third signal, and a fourth virtual focal point location of the fourth signal, the fourth virtual focal point location and the third virtual focal point location being different, wherein the second angular relationship is a second angle from a second line, connecting the third virtual focal point location and the fourth virtual focal point location, to the wireless signaling device;
obtaining, at the apparatus, a third phase difference indication corresponding to a third difference in phase between a fifth signal wirelessly received, at a fifth time, by the wireless signaling device from a third transmitter and a sixth signal wirelessly received, at a sixth time that is different from the fifth time, by the wireless signaling device from the third transmitter;
determining, at the apparatus, a third angular relationship between the third transmitter and the wireless signaling device based on the third phase difference indication, a fifth virtual focal point location of the fifth signal, and a sixth virtual focal point location of the sixth signal, the sixth virtual focal point location and the fifth virtual focal point location being different, wherein the third angular relationship is a third angle from a third line, connecting the fifth virtual focal point location and the sixth virtual focal point location, to the wireless signaling device; and
determining, at the apparatus, a position estimate of the wireless signaling device based on the first angular relationship, the second angular relationship, the third angular relationship, a location of the first transmitter, a location of the second transmitter, and a location the third transmitter.

16. The angular relationship determination method of claim 10, further comprising instructing the transmitter to transmit the first signal with the first virtual focal point location and the second signal with the second virtual focal point location.

17. The angular relationship determination method of claim 16, wherein the transmitter is an intelligent reflecting surface and the angular relationship determination method further comprises transmitting, from the apparatus via a communication interface, a message to the transmitter instructing the transmitter to transmit the first signal and the second signal.

18. The angular relationship determination method of claim 16, wherein instructing the transmitter to transmit the first signal with the first virtual focal point location and the second signal with the second virtual focal point location comprises instructing the transmitter to transmit the first signal and the second signal such that a distance between the first virtual focal point location and the second virtual focal point location is no more than half a wavelength at a frequency of the first signal and the second signal.

19. The angular relationship determination method of claim 10, further comprising transmitting, from the apparatus via a communication interface, a message instructing the wireless signaling device to provide the first phase difference indication, or instructing the wireless signaling device to provide a first measured phase of the first signal and a second measured phase of the second signal, or instructing the wireless signaling device to provide a combination thereof.

20. An apparatus comprising:
means for obtaining a first phase difference indication corresponding to a first difference in phase between a first signal wirelessly received, at a first time, by a wireless signaling device from a transmitter and a second signal wirelessly received, at a second time that is different from the first time, by the wireless signaling device from the transmitter; and
means for determining a first angular relationship between the transmitter and the wireless signaling device based on the first phase difference indication, a first virtual focal point location of the first signal, and a second virtual focal point location of the second signal, the second virtual focal point location and the first virtual focal point location being different, wherein a virtual focal point location is a location from which a signal appears to originate based on a phase surface of the signal, and wherein the first angular relationship is a first angle from a first line, connecting the first virtual focal point location and the second virtual focal point location, to the wireless signaling device.

21. The apparatus of claim 20, further comprising:
means for obtaining a second phase difference indication corresponding to a second difference in phase between a third signal wirelessly received, at a third time, by the wireless signaling device from the transmitter and a fourth signal wirelessly received, at a fourth time that is different from the third time, by the wireless signaling device from the transmitter; and
means for determining a second angular relationship between the transmitter and the wireless signaling device based on the second phase difference indication, a third virtual focal point location of the third signal, and a fourth virtual focal point location of the fourth signal, the fourth virtual focal point location and the third virtual focal point location being different, wherein the second angular relationship is a second angle from a second line, connecting the third virtual focal point location and the fourth virtual focal point location, to the wireless signaling device;
wherein a first direction of a first vector from the first virtual focal point location to the second virtual focal point location is different from a second direction from the third virtual focal point location to the fourth virtual focal point location.

22. The apparatus of claim 21, wherein the third virtual focal point location is either the first virtual focal point location or the second virtual focal point location.

23. The apparatus of claim 21, further comprising means for determining a position estimate of the wireless signaling device based on the first angular relationship, the second angular relationship, a location of the transmitter, and a distance between the transmitter and the wireless signaling device.

24. The apparatus of claim 23, further comprising means for instructing the transmitter to focus a beam at the position estimate of the wireless signaling device.

25. The apparatus of claim 20, wherein the transmitter is a first transmitter, and the apparatus further comprises:
    means for obtaining a second phase difference indication corresponding to a second difference in phase between a third signal wirelessly received, at a third time, by the wireless signaling device from a second transmitter and a fourth signal wirelessly received, at a fourth time that is different from the third time, by the wireless signaling device from the second transmitter;
    means for determining a second angular relationship between the second transmitter and the wireless signaling device based on the second phase difference indication, a third virtual focal point location of the third signal, and a fourth virtual focal point location of the fourth signal, the fourth virtual focal point location and the third virtual focal point location being different, wherein the second angular relationship is a second angle from a second line, connecting the third virtual focal point location and the fourth virtual focal point location, to the wireless signaling device;
    means for obtaining a third phase difference indication corresponding to a third difference in phase between a fifth signal wirelessly received, at a fifth time, by the wireless signaling device from a third transmitter and a sixth signal wirelessly received, at a sixth time that is different from the fifth time, by the wireless signaling device from the third transmitter;
    means for determining a third angular relationship between the third transmitter and the wireless signaling device based on the third phase difference indication, a fifth virtual focal point location of the fifth signal, and a sixth virtual focal point location of the sixth signal, the sixth virtual focal point location and the fifth virtual focal point location being different, wherein the third angular relationship is a third angle from a third line, connecting the fifth virtual focal point location and the sixth virtual focal point location, to the wireless signaling device; and
    means for determining a position estimate of the wireless signaling device based on the first angular relationship, the second angular relationship, the third angular relationship, a location of the first transmitter, a location of the second transmitter, and a location the third transmitter.

26. The apparatus of claim 20, further comprising means for instructing the transmitter to transmit the first signal with the first virtual focal point location and the second signal with the second virtual focal point location.

27. The apparatus of claim 26, wherein the transmitter is an intelligent reflecting surface and the apparatus further comprises means for transmitting a message to the transmitter instructing the transmitter to transmit the first signal and the second signal.

28. The apparatus of claim 26, wherein the means for instructing the transmitter to transmit the first signal with the first virtual focal point location and the second signal with the second virtual focal point location comprises means for instructing the transmitter to transmit the first signal and the second signal such that a distance between the first virtual focal point location and the second virtual focal point location is no more than half a wavelength at a frequency of the first signal and the second signal.

29. The apparatus of claim 20, further comprising means for transmitting a message instructing the wireless signaling device to provide the first phase difference indication, or instructing the wireless signaling device to provide a first measured phase of the first signal and a second measured phase of the second signal, or instructing the wireless signaling device to provide a combination thereof.

30. A non-transitory, processor-readable storage medium comprising processor-readable instructions to cause a processor, of an apparatus, to:
    obtain a first phase difference indication corresponding to a first difference in phase between a first signal wirelessly received, at a first time, by a wireless signaling device from a transmitter and a second signal wirelessly received, at a second time that is different from the first time, by the wireless signaling device from the transmitter; and
    determine a first angular relationship between the transmitter and the wireless signaling device based on the first phase difference indication, a first virtual focal point location of the first signal, and a second virtual focal point location of the second signal, the second virtual focal point location and the first virtual focal point location being different, wherein a virtual focal point location is a location from which a signal appears to originate based on a phase surface of the signal, and wherein the first angular relationship is a first angle from a first line, connecting the first virtual focal point location and the second virtual focal point location, to the wireless signaling device.

* * * * *